(12) United States Patent
Evangelidis et al.

(10) Patent No.: US 12,238,495 B2
(45) Date of Patent: Feb. 25, 2025

(54) EYEWEAR WITH AUDIO SOURCE SEPARATION USING POSE TRACKERS

(71) Applicants: Georgios Evangelidis, Vienna (AT);
Ashwani Arya, Cypress, CA (US);
Jennica Pounds, Bellevue, WA (US);
Andrei Rybin, Lehi, UT (US)

(72) Inventors: Georgios Evangelidis, Vienna (AT);
Ashwani Arya, Cypress, CA (US);
Jennica Pounds, Bellevue, WA (US);
Andrei Rybin, Lehi, UT (US)

(73) Assignee: Snap Inc., Santa Monica, CA (US)

( * ) Notice: Subject to any disclaimer, the term of this patent is extended or adjusted under 35 U.S.C. 154(b) by 196 days.

(21) Appl. No.: 17/711,494

(22) Filed: Apr. 1, 2022

(65) Prior Publication Data
US 2023/0319476 A1    Oct. 5, 2023

(51) Int. Cl.
*H04R 5/04*        (2006.01)
*G02C 11/00*       (2006.01)
*G06F 3/01*        (2006.01)
*G06F 3/16*        (2006.01)
*H04R 1/10*        (2006.01)
*H04R 5/027*       (2006.01)

(52) U.S. Cl.
CPC ............. *H04R 5/04* (2013.01); *G02C 11/10* (2013.01); *G06F 3/012* (2013.01); *G06F 3/165* (2013.01); *H04R 1/105* (2013.01); *H04R 1/1091* (2013.01); *H04R 5/027* (2013.01)

(58) Field of Classification Search
CPC ........ H04R 5/04; H04R 1/105; H04R 1/1091; H04R 5/027; G02C 11/10; G06F 3/012; G06F 3/165
USPC ........................................... 381/74
See application file for complete search history.

(56) References Cited

U.S. PATENT DOCUMENTS 10,595,149 B1 *  3/2020  Lovitt ................. H04R 5/027

OTHER PUBLICATIONS

Micusik et al. ("Ego-Motion Alignment from Face Detections for Collaborative Augmented Reality", ArXiv., Cornell University, Oct. 5, 2020) (Year: 2020).*

(Continued)

*Primary Examiner* — Paul Kim
(74) *Attorney, Agent, or Firm* — CM Law; Stephen J. Weed

(57) ABSTRACT

Electronic eyewear device providing simplified audio source separation, also referred to as voice/sound unmixing, using alignment between respective device trajectories. Multiple users of electronic eyewear devices in an environment may simultaneously generate audio signals (e.g., voices/sounds) that are difficult to distinguish from one another. The electronic eyewear device tracks the location of moving remote electronic eyewear devices of other users, or an object of the other users, such as the remote user's face, to provide audio source separation using location of the sound sources. The simplified voice unmixing uses a microphone array of the electronic eyewear device and the known location of the remote user's electronic eyewear device with respect to the user's electronic eyewear device to facilitate audio source separation.

20 Claims, 18 Drawing Sheets

(56) References Cited

OTHER PUBLICATIONS

International Search Report and Written Opinion received in Patent Cooperation Treaty Application No. PCT/US2023/016831, dated Jun. 20, 2023, 9 pages.
Micusik, Branislav, et al., "Ego-Motion Alignment from Face Detections for Collaborative Augmented Reality", ArXiv.org, Cornell University, Oct. 5, 2020, pp. 1-25.

* cited by examiner

US 12,238,495 B2

EYEWEAR WITH AUDIO SOURCE SEPARATION USING POSE TRACKERS

TECHNICAL FIELD

The present subject matter relates to an electronic eyewear device, e.g., smart glasses having see-through displays, with audio source separation.

BACKGROUND

Portable electronic eyewear devices, such as smart glasses, headwear, and headgear available today integrate microphones, cameras, and see-through displays. Microphones and speakers used by the electronic eyewear devices can be used to enhance a user's experience in an environment.

BRIEF DESCRIPTION OF THE DRAWINGS

The drawing figures depict one or more implementations, by way of example only, not by way of limitations. In the figures, like reference numerals refer to the same or similar elements.

DETAILED DESCRIPTION

Figure 1A:
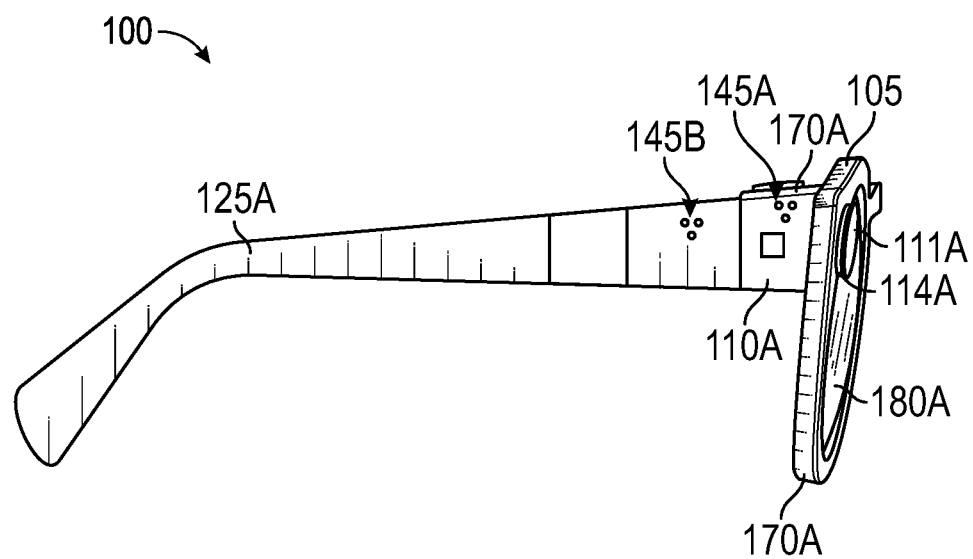
FIG. 1A is a side view of an example hardware configuration of an electronic eyewear device, which shows a right optical assembly with an image display, and field of view adjustments are applied to a user interface presented on the image display based on detected head or eye movement by a user.

This disclosure is directed to an electronic eyewear device with simplified audio source separation, also referred to as voice/sound unmixing, using alignment between respective trajectories of the electronic eyewear device and a remote electronic eyewear device. Multiple users of electronic eyewear devices in an environment may generate audio signals that are difficult to distinguish from one another. The electronic eyewear device of a user tracks the location of moving remote electronic eyewear devices of other users, or an object of the other users, such as their face, to provide audio source separation using a location of the sound source. The simplified audio source separation uses a microphone array of the electronic eyewear device and the known location of the remote user's electronic eyewear device with respect to the electronic eyewear device to facilitate audio source separation.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

In the following detailed description, numerous specific details are set forth by way of examples to provide a thorough understanding of the relevant teachings. However, it should be apparent to those skilled in the art that the present teachings may be practiced without such details. In other instances, well known methods, procedures, components, and circuitry have been described at a relatively high-level, without detail, to avoid unnecessarily obscuring aspects of the present teachings.

The term "coupled" as used herein refers to any logical, optical, physical or electrical connection, link or the like by which signals or light produced or supplied by one system element are imparted to another coupled element. Unless described otherwise, coupled elements or devices are not necessarily directly connected to one another and may be separated by intermediate components, elements or communication media that may modify, manipulate, or carry the light or signals.

The orientations of the electronic eyewear device, associated components and any complete devices incorporating an eye scanner and camera such as shown in any of the drawings, are given by way of example only, for illustration and discussion purposes. In operation for a particular variable optical processing application, the electronic eyewear device may be oriented in any other direction suitable to the particular application of the electronic eyewear device, for example up, down, sideways, or any other orientation. Also, to the extent used herein, any directional term, such as front, rear, inwards, outwards, towards, left, right, lateral, longitudinal, up, down, upper, lower, top, bottom and side, are used by way of example only, and are not limiting as to direction or orientation of any optic or component of an optic constructed as otherwise described herein.

Reference now is made in detail to the examples illustrated in the accompanying drawings and discussed below.

Figure 1B:
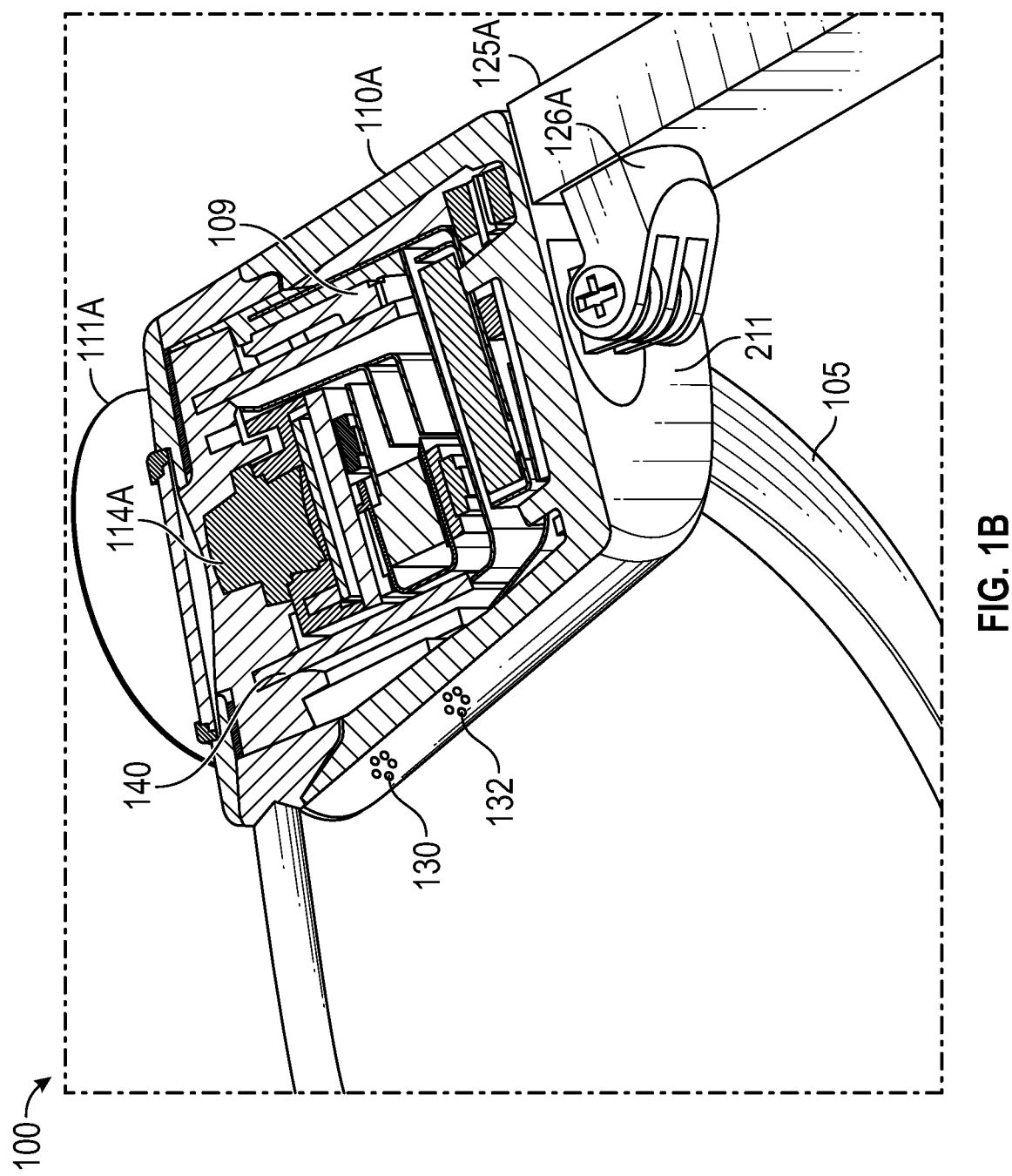
FIG. 1B is a top cross-sectional view of a temple of the electronic eyewear device of FIG. 1A depicting a visible light camera, a head movement tracker for tracking the head movement of the user of the electronic eyewear device, and a circuit board.
Figure 1C:
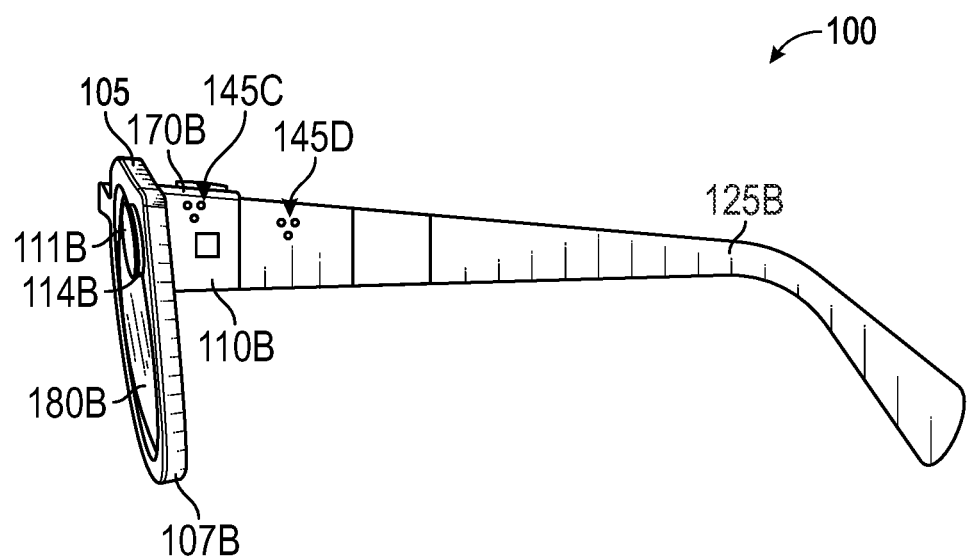
FIG. 1C is a side view of an example hardware configuration of an electronic eyewear device, which shows a left optical assembly with an image display.
Figure 2A:
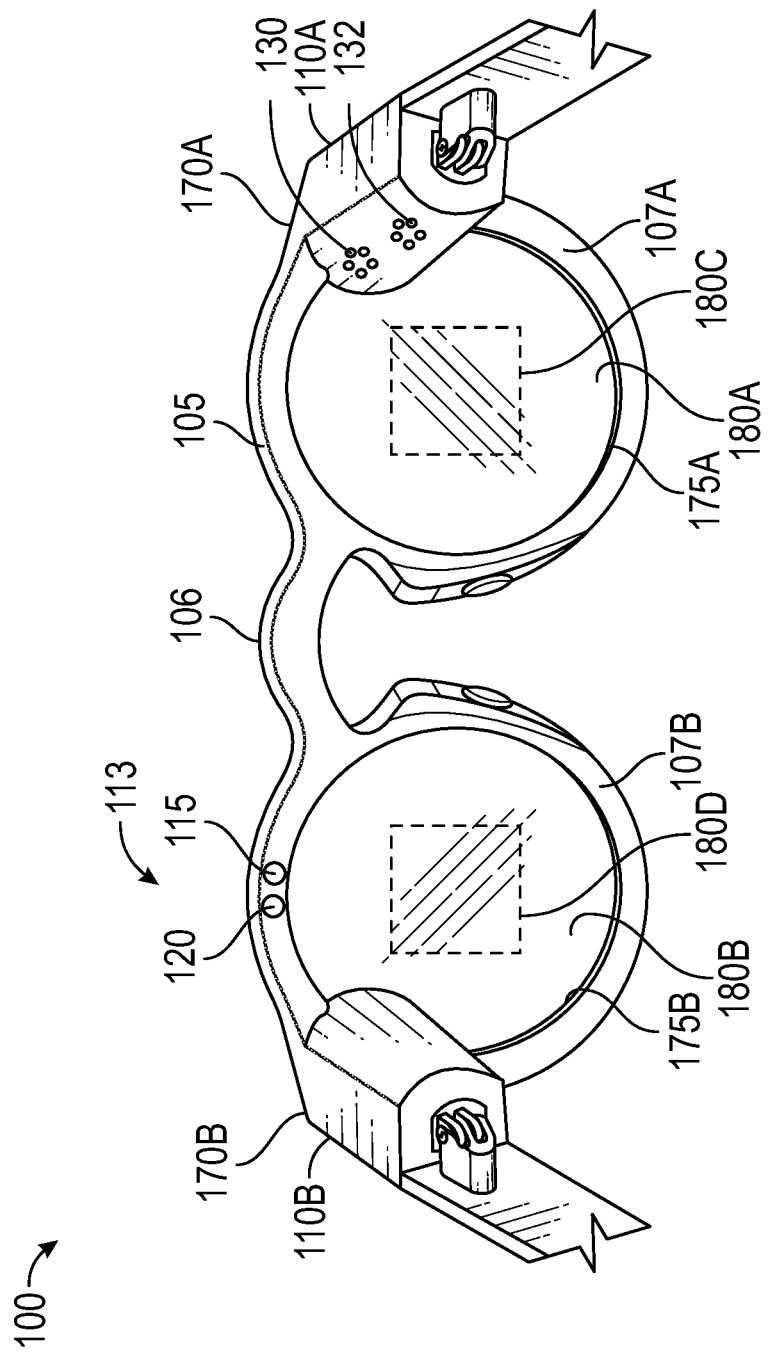
FIG. 2A is a rear view of an example hardware configuration of an electronic eyewear device, which includes an eye scanner on a frame, for use in a system for identifying a user of the electronic eyewear device.

FIGS. 1A and 1C are side views of an example hardware configuration of an electronic eyewear device 100, which includes an optical assembly 180A with an image display 180C and another optical assembly 180B with an image display 180D, respectively (FIG. 2A). Electronic eyewear device 100 includes multiple visible light cameras 114A-B (FIG. 7) that form a stereo camera, of which a first visible light camera 114A is located on a right temple 110A and a second visible light camera is located on a left temple 110B.

Electronic eyewear device 100 includes a plurality of microphones 145A-D that form a microphone array 145, of which a first (right front) microphone 145A is located on the right temple 110A and a second (right back) microphone 145B is located on the right temple 110A. A third (left front) microphone 145C is located on the left temple 110B and a fourth (left back) microphone 145C is located on the left temple 110B. To determine the direction of arrival for sounds in the environment, the microphones 145A-D are coupled to a processor 932 (FIG. 9) for digital processing of the signals from the array. The microphones 145A-D send data signals to processor 932 that then determines the direction and intensity of a sound source relative to the electronic eyewear device 100. In an example, a user of the electronic eyewear device 100 can have a conversation with a person. The microphone array 145 detects the voice of the person and sends signals to processor 932. Processor 932 determines the direction of arrival of the voice of the person with reference to the electronic eyewear device 100.

The visible light cameras 114A and 114B may include an image sensor that is sensitive to the visible light range wavelength. Each of the visible light cameras 114A and 114B has a different frontward facing angle of coverage, for example, visible light camera 114A has the depicted angle of coverage 111A. The angle of coverage is an angle range in which the respective image sensor of the visible light cameras 114A and 114B detects incoming light and generates image data. Examples of such visible lights cameras 114A and 114B include a high-resolution complementary metal-oxide-semiconductor (CMOS) image sensor and a video graphic array (VGA) camera, such as 640p (e.g., 640×480 pixels for a total of 0.3 megapixels), 720p, 1080p, 4K, or 8K. Image sensor data from the visible light cameras 114A and 114B may be captured along with geolocation data, digitized by an image processor, and stored in a memory.

To provide stereoscopic vision, visible light cameras 114A and 114B may be coupled to an image processor (element 912 of FIG. 9) for digital processing and adding a timestamp corresponding to the scene in which the image is captured. Image processor 912 may include circuitry to receive signals from the visible light cameras 114A and 114B and to process those signals from the visible light cameras 114A and 114B into a format suitable for storage in the memory (element 934 of FIG. 9). The timestamp may be added by the image processor 912 or other processor that controls operation of the visible light cameras 114A and 114B. Visible light cameras 114A and 114B allow the stereo camera to simulate human binocular vision. Stereo cameras also provide the ability to reproduce three-dimensional images of a three-dimensional scene (scene 715 of FIG. 7) based on two captured images (image pairs 758A and 758B of FIG. 7) from the visible light cameras 114A and 114B, respectively, having the same timestamp. Such three-dimensional images allow for an immersive virtual experience that feels realistic, e.g., for virtual reality or video gaming. For stereoscopic vision, the pair of images 758A and 758B may be generated at a given moment in time—one image for each of the visible light cameras 114A and 114B. When the pair of generated images 758A and 758B from the frontward facing field of view (FOV) 111A and 111B of the visible light cameras 114A and 114B are stitched together (e.g., by the image processor 912), depth perception is provided by the optical assemblies 180A and 180B.

In an example, the electronic eyewear device 100 includes a frame 105, a right rim 107A, a right temple 110A extending from a right lateral side 170A of the frame 105, and a see-through image display 180C (FIGS. 2A-B) comprising optical assembly 180A to present a GUI or other image to a user. The electronic eyewear device 100 includes the first visible light camera 114A connected to the frame 105 or the right temple 110A to capture a first image of the scene. Electronic eyewear device 100 further includes the second visible light camera 114B connected to the frame 105 or the left temple 110B to capture (e.g., simultaneously with the first visible light camera 114A) a second image of the scene which at least partially overlaps the first image. Although not shown in FIGS. 1A and 1B, a high speed (HS) processor 932 (FIG. 9) is coupled to the electronic eyewear device 100 and is connected to the visible light cameras 114A and 114B and memory 934 (FIG. 9) accessible to the processor 932, and programming in the memory 934 may be provided in the electronic eyewear device 100 itself.

Figure 2B:
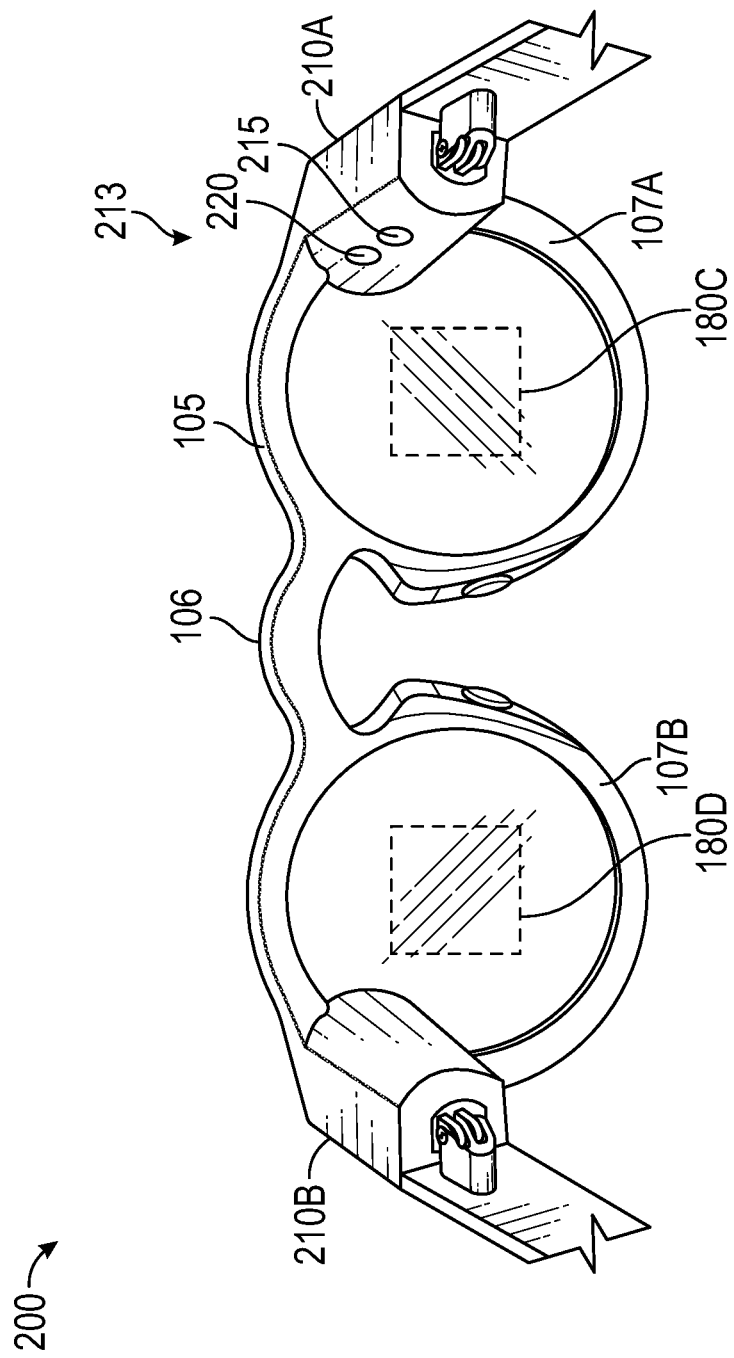
FIG. 2B is a rear view of an example hardware configuration of another electronic eyewear device, which includes an eye scanner on a temple, for use in a system for identifying a user of the electronic eyewear device.

Although not shown in FIG. 1A, the electronic eyewear device 100 also may include a head movement tracker (element 109 of FIG. 1B) or an eye movement tracker (element 113 of FIG. 2A or element 213 of FIG. 2B). Electronic eyewear device 100 may further include the see-through image displays 180C and D of optical assemblies 180A and 180B, respectively, for presenting a sequence of displayed images. The electronic eyewear devices 100 may further include an image display driver (element 942 of FIG. 9) coupled to the see-through image displays 180C and 180D to drive the image displays 180C and 180D. The see-through image displays 180C and 180D and the image display driver are described in further detail below. Electronic eyewear device 100 may further include the memory 934 and the processor 932 (FIG. 4) having access to the image display driver 942 and the memory 934, as well as programming in the memory 934. Execution of the programming by the processor 932 configures the electronic eyewear device 100 to perform functions, including functions to present, via the see-through image displays 180C and 180D, an initial displayed image of the sequence of displayed images, the initial displayed image having an initial field of view corresponding to an initial head direction or an initial eye gaze direction as determined by the eye movement tracker 113 or 213.

Execution of the programming by the processor 932 may further configure the electronic eyewear device 100 to detect movement of a user of the electronic eyewear device 100 by: (i) tracking, via the head movement tracker (element 109 of FIG. 1B), a head movement of a head of the user, or (ii) tracking, via an eye movement tracker (element 113 of FIG. 2A or element 213 of FIG. 2B), an eye movement of an eye of the user of the electronic eyewear device 100. Execution of the programming by the processor 932 may further configure the electronic eyewear device 100 to determine a field of view adjustment to the initial field of view of the initial displayed image based on the detected movement of the user. The field of view adjustment may include a successive field of view corresponding to a successive head direction or a successive eye direction. Execution of the programming by the processor 932 may further configure the electronic eyewear device 100 to generate successive displayed images of the sequence of displayed images based on the field of view adjustment. Execution of the programming by the processor 932 may further configure the electronic eyewear device 100 to present, via the see-through image displays 180C and 180D of the optical assemblies 180A and 180B, the successive displayed images.

FIG. 1B is an illustration depicting a top cross-sectional view of optical components and electronics in a portion of the electronic eyewear device 100 illustrated in FIG. 1A depicting the first visible light camera 114A, a head movement tracker 109, and a circuit board 140. Construction and placement of the second visible light camera 114B is substantially similar to the first visible light camera 114A, except the connections and coupling are on the other lateral side 170B (FIG. 2A). As shown, the electronic eyewear device 100 includes the first visible light camera 114A and a circuit board, which may be a flexible printed circuit board (PCB) 140. A first hinge 126A connects the right temple 110A to a hinged arm 125A of the electronic eyewear device 100. In some examples, components of the first visible light camera 114A, the flexible PCB 140, or other electrical connectors or contacts may be located on the right temple 110A or the first hinge 126A.

As shown, electronic eyewear device 100 may include a head movement tracker 109, which includes, for example, an inertial measurement unit (IMU). An inertial measurement unit is an electronic device that measures and reports a body's specific force, angular rate, and sometimes the magnetic field surrounding the body, using a combination of accelerometers and gyroscopes, sometimes also magnetometers. The inertial measurement unit works by detecting linear acceleration using one or more accelerometers and rotational rate using one or more gyroscopes. Typical configurations of inertial measurement units contain one accelerometer, gyroscope, and magnetometer per axis for each of the three axes: horizontal axis for left-right movement (X), vertical axis (Y) for top-bottom movement, and depth or distance axis for up-down movement (Z). The accelerometer detects the gravity vector. The magnetometer defines the rotation in the magnetic field (e.g., facing south, north, etc.) like a compass that generates a heading reference. The three accelerometers detect acceleration along the horizontal, vertical, and depth axis defined above, which can be defined relative to the ground, the electronic eyewear device 100, or the user wearing the electronic eyewear device 100.

Electronic eyewear device 100 may detect movement of the user of the electronic eyewear device 100 by tracking, via the head movement tracker 109, the head movement of the user's head. The head movement includes a variation of head direction on a horizontal axis, a vertical axis, or a combination thereof from the initial head direction during presentation of the initial displayed image on the image display. In one example, tracking, via the head movement tracker 109, the head movement of the user's head includes measuring, via the inertial measurement unit, the initial head direction on the horizontal axis (e.g., X axis), the vertical axis (e.g., Y axis), or the combination thereof (e.g., transverse or diagonal movement). Tracking, via the head movement tracker 109, the head movement of the user's head further includes measuring, via the inertial measurement unit, a successive head direction on the horizontal axis, the vertical axis, or the combination thereof during presentation of the initial displayed image.

Tracking, via the head movement tracker 109, the head movement of the user's head may include determining the variation of head direction based on both the initial head direction and the successive head direction. Detecting movement of the user of the electronic eyewear device 100 may further include in response to tracking, via the head movement tracker 109, the head movement of the user's head, determining that the variation of head direction exceeds a deviation angle threshold on the horizontal axis, the vertical axis, or the combination thereof. In sample configurations, the deviation angle threshold is between about 3° to 10°. As used herein, the term "about" when referring to an angle means±10% from the stated amount.

Variation along the horizontal axis slides three-dimensional objects, such as characters, Bitmojis, application icons, etc. in and out of the field of view by, for example, hiding, unhiding, or otherwise adjusting visibility of the three-dimensional object. Variation along the vertical axis, for example, when the user looks upwards, in one example, displays weather information, time of day, date, calendar appointments, etc. In another example, when the user looks downwards on the vertical axis, the electronic eyewear device 100 may power down.

As shown in FIG. 1B, the right temple 110A includes temple body 211 that is configured to receive a temple cap, with the temple cap omitted in the cross-section of FIG. 1B. Disposed inside the right temple 110A are various interconnected circuit boards, such as PCBs or flexible PCBs 140, that include controller circuits for first visible light camera 114A, microphone(s) 130, speaker(s) 132, low-power wireless circuitry (e.g., for wireless short-range network communication via BLUETOOTH®), and high-speed wireless circuitry (e.g., for wireless local area network communication via WI-FI® and positioning via GPS).

The first visible light camera 114A is coupled to or disposed on the flexible PCB 140 and covered by a visible light camera cover lens, which is aimed through opening(s) formed in the right temple 110A. In some examples, the frame 105 connected to the right temple 110A includes the opening(s) for the visible light camera cover lens. The frame 105 may include a front-facing side configured to face outwards away from the eye of the user. The opening for the visible light camera cover lens may be formed on and through the front-facing side. In the example, the first visible light camera 114A has an outward facing angle of coverage 111A with a line of sight or perspective of the right eye of the user of the electronic eyewear device 100. The visible light camera cover lens also can be adhered to an outward facing surface of the right temple 110A in which an opening is formed with an outward facing angle of coverage, but in a different outwards direction. The coupling can also be indirect via intervening components.

The first visible light camera 114A may be connected to the first see-through image display 180C of the first optical assembly 180A to generate a first background scene of a first successive displayed image. The second visible light camera 114B may be connected to the second see-through image display 180D of the second optical assembly 180B to generate a second background scene of a second successive displayed image. The first background scene and the second background scene may partially overlap to present a three-dimensional observable area of the successive displayed image.

Flexible PCB 140 may be disposed inside the right temple 110A and coupled to one or more other components housed in the right temple 110A. Although shown as being formed on the circuit boards 140 of the right temple 110A, the first visible light camera 114A can be formed on another circuit board (not shown) in one of the left temple 110B, the hinged arm 125A, the hinged arm 125B, or the frame 105.

FIG. 2A is an illustration depicting a rear view of an example hardware configuration of an electronic eyewear device 100. As shown in FIG. 2A, the electronic eyewear device 100 is in a form configured for wearing by a user, which are eyeglasses in the example of FIG. 2A. The electronic eyewear device 100 can take other forms and may incorporate other types of frameworks, for example, a headgear, a headset, or a helmet.

In the eyeglasses example, electronic eyewear device 100 includes the frame 105 which includes the right rim 107A connected to the left rim 107B via the bridge 106, which is configured to receive a nose of the user. The right and left rims 107A and 107B include respective apertures 175A and 175B, which hold the respective optical elements 180A and 180B, such as a lens and the see-through displays 180C and 180D. As used herein, the term lens is meant to cover transparent or translucent pieces of glass or plastic having curved and flat surfaces that cause light to converge/diverge or that cause little or no convergence/divergence.

Although shown as having two optical elements 180A and 180B, the electronic eyewear device 100 can include other arrangements, such as a single optical element depending on the application or intended user of the electronic eyewear device 100. As further shown, electronic eyewear device 100 includes the right temple 110A adjacent the right lateral side 170A of the frame 105 and the left temple 110B adjacent the left lateral side 170B of the frame 105. The temples 110A and 110B may be integrated into the frame 105 on the respective sides 170A and 170B (as illustrated) or implemented as separate components attached to the frame 105 on the respective sides 170A and 170B. Alternatively, the temples 110A and 110B may be integrated into hinged arms 125A and 125B attached to the frame 105.

In the example of FIG. 2A, an eye scanner 113 is provided that includes an infrared emitter 115 and an infrared camera 120. Visible light cameras typically include a blue light filter to block infrared light detection. In an example, the infrared camera 120 is a visible light camera, such as a low-resolution video graphic array (VGA) camera (e.g., 640×480 pixels for a total of 0.3 megapixels), with the blue filter removed. The infrared emitter 115 and the infrared camera 120 may be co-located on the frame 105. For example, both are shown as connected to the upper portion of the left rim 107B. The frame 105 or one or more of the temples 110A and 110B may include a circuit board (not shown) that includes the infrared emitter 115 and the infrared camera 120. The infrared emitter 115 and the infrared camera 120 can be connected to the circuit board by soldering, for example.

Other arrangements of the infrared emitter 115 and infrared camera 120 may be implemented, including arrangements in which the infrared emitter 115 and infrared camera 120 are both on the right rim 107A, or in different locations on the frame 105. For example, the infrared emitter 115 may be on the left rim 107B and the infrared camera 120 may be on the right rim 107A. In another example, the infrared emitter 115 may be on the frame 105 and the infrared camera 120 may be on one of the temples 110A or 110B, or vice versa. The infrared emitter 115 can be connected essentially anywhere on the frame 105, right temple 110A, or left temple 110B to emit a pattern of infrared light. Similarly, the infrared camera 120 can be connected essentially anywhere on the frame 105, right temple 110A, or left temple 110B to capture at least one reflection variation in the emitted pattern of infrared light.

The infrared emitter 115 and infrared camera 120 may be arranged to face inwards towards an eye of the user with a partial or full field of view of the eye to identify the respective eye position and gaze direction. For example, the infrared emitter 115 and infrared camera 120 may be positioned directly in front of the eye, in the upper part of the frame 105 or in the temples 110A or 110B at either ends of the frame 105.

FIG. 2B is an illustration depicting a rear view of an example hardware configuration of another electronic eyewear device 200. In this example configuration, the electronic eyewear device 200 is depicted as including an eye scanner 213 on a right temple 210A. As shown, an infrared emitter 215 and an infrared camera 220 are co-located on the right temple 210A. The eye scanner 213 or one or more components of the eye scanner 213 can be located on the left temple 210B and other locations of the electronic eyewear device 200, for example, the frame 105. The infrared emitter 215 and infrared camera 220 are like that of FIG. 2A, but the eye scanner 213 can be varied to be sensitive to different light wavelengths as described previously in FIG. 2A. Similar to FIG. 2A, the electronic eyewear device 200 includes a frame 105 which includes a right rim 107A which is connected to a left rim 107B via a bridge 106. The rims 107A-B may include respective apertures which hold the respective optical elements 180A and 180B comprising the see-through displays 180C and 180D.

Figure 2C:
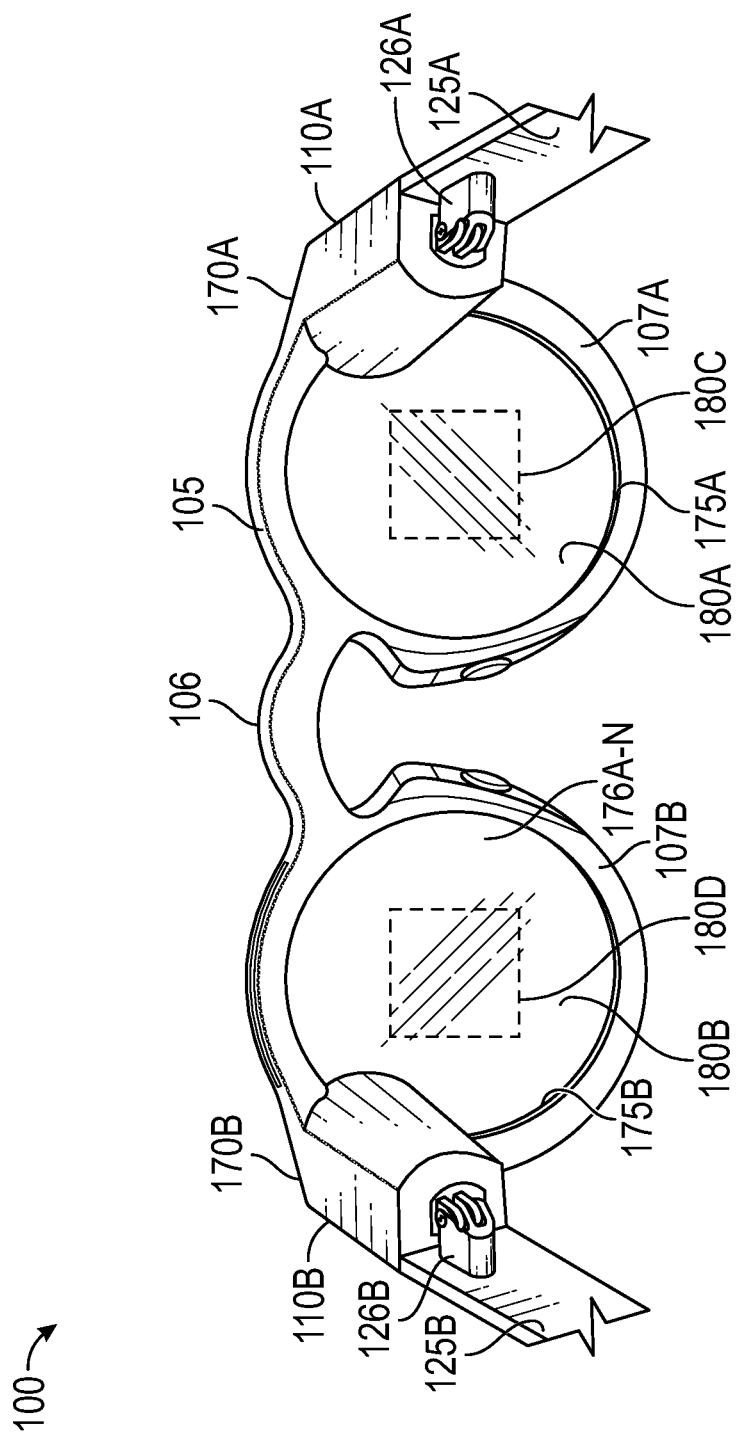
FIGS. 2C and 2D are rear views of example hardware configurations of the electronic eyewear device, including two different types of image displays.
Figure 2D:
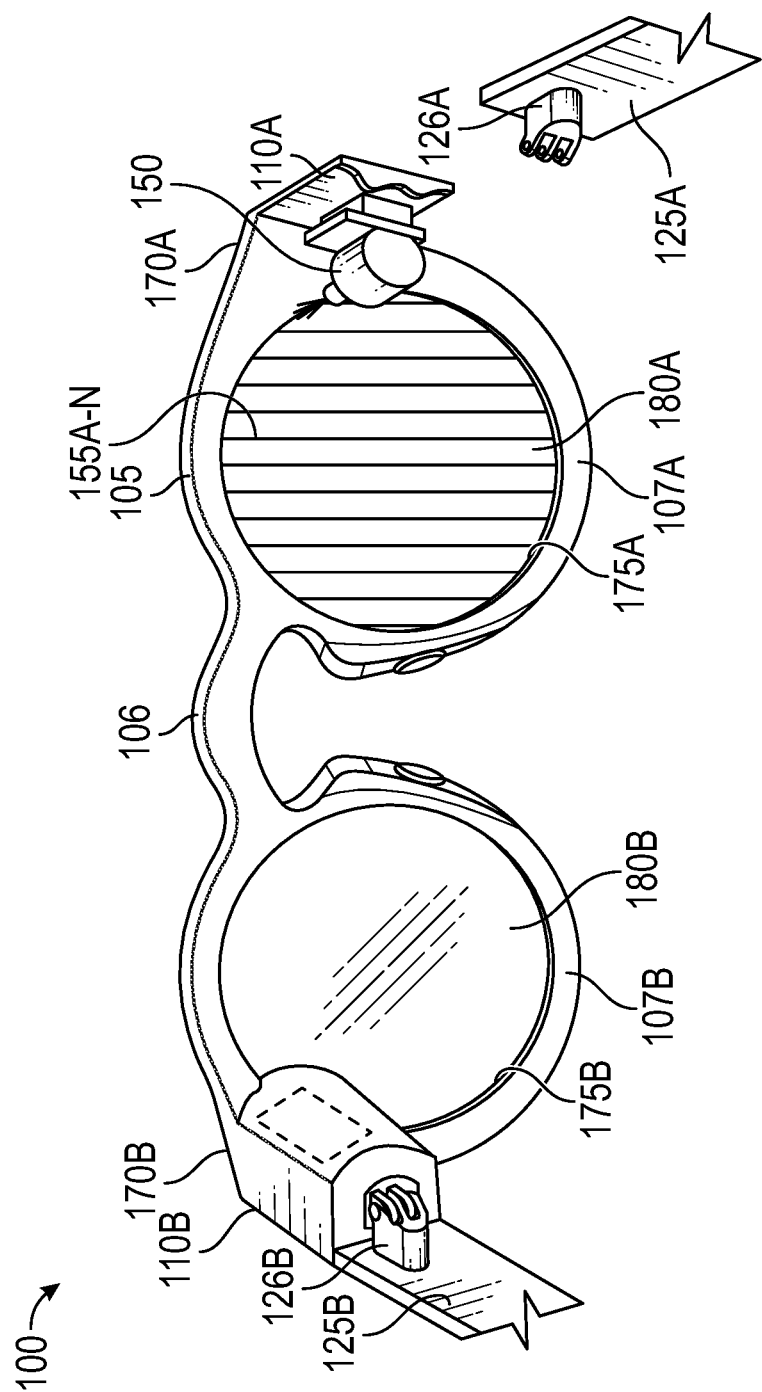

FIG. 2C and FIG. 2D are illustrations depicting rear views of example hardware configurations of the electronic eyewear device 100, including two different types of see-through image displays 180C and 180D. In one example, these see-through image displays 180C and 180D of optical assemblies 180A and 180B include an integrated image display. As shown in FIG. 2C, the optical assemblies 180A and 180B include a display matrix 180C and 180D of any suitable type, such as a liquid crystal display (LCD), an organic light-emitting diode (OLED) display, a waveguide display, or any other such display.

The optical assemblies 180A and 180B also includes an optical layer or layers 176A-N, which can include lenses, optical coatings, prisms, mirrors, waveguides, optical strips, and other optical components in any combination. The optical layers 176 can include a prism having a suitable size and configuration and including a first surface for receiving light from display matrix and a second surface for emitting light to the eye of the user. The prism of the optical layers 176 may extend over all or at least a portion of the respective apertures 175A and 175B formed in the rims 107A and 107B to permit the user to see the second surface of the prism when the eye of the user is viewing through the corresponding rims 107A and 107B. The first surface of the prism of the optical layers 176 faces upwardly from the frame 105 and the display matrix overlies the prism so that photons and light emitted by the display matrix impinge the first surface. The prism may be sized and shaped so that the light is refracted within the prism and is directed towards the eye of the user by the second surface of the prism of the optical layers 176. In this regard, the second surface of the prism of the optical layers 176 can be convex to direct the light towards the center of the eye. The prism can be sized and shaped to magnify the image projected by the see-through image displays 180C and 180D, and the light travels through the prism so that the image viewed from the second surface is larger in one or more dimensions than the image emitted from the see-through image displays 180C and 180D.

In another example, the see-through image displays 180C and 180D of optical assemblies 180A and 180B may include a projection image display as shown in FIG. 2D. The optical assemblies 180A and 180B include a projector 150, which may be a three-color projector using a scanning mirror, a galvanometer, a laser projector, or other types of projectors. During operation, an optical source such as a projector 150 is disposed in or on one of the temples 110A or 110B of the electronic eyewear device 100. Optical assemblies 180A and 180B may include one or more optical strips 155A-N spaced apart across the width of the lens of the optical assemblies 180A and 180B or across a depth of the lens between the front surface and the rear surface of the lens.

As the photons projected by the projector 150 travel across the lens of the optical assemblies 180A and 180B, the photons encounter the optical strips 155. When a particular photon encounters a particular optical strip, the photon is either redirected towards the user's eye, or it passes to the next optical strip. A combination of modulation of projector 150, and modulation of optical strips, may control specific photons or beams of light. In an example, a processor controls the optical strips 155 by initiating mechanical, acoustic, or electromagnetic signals. Although shown as having two optical assemblies 180A and 180B, the electronic eyewear device 100 can include other arrangements, such as a single or three optical assemblies, or the optical assemblies 180A and 180B may have different arrangements depending on the application or intended user of the electronic eyewear device 100.

As further shown in FIG. 2C and FIG. 2D, electronic eyewear device 100 includes a right temple 110A adjacent the right lateral side 170A of the frame 105 and a left temple 110B adjacent the left lateral side 170B of the frame 105. The temples 110A and 110B may be integrated into the frame 105 on the respective lateral sides 170A and 170B (as illustrated) or implemented as separate components attached to the frame 105 on the respective sides 170A and 170B. Alternatively, the temples 110A and 110B may be integrated into the hinged arms 125A and 125B attached to the frame 105.

In one example, the see-through image displays include the first see-through image display 180C and the second see-through image display 180D. Electronic eyewear device 100 may include first and second apertures 175A and 175B that hold the respective first and second optical assemblies 180A and 180B. The first optical assembly 180A may include the first see-through image display 180C (e.g., a display matrix, or optical strips and a projector in the right temple 110A). The second optical assembly 180B may include the second see-through image display 180D (e.g., a display matrix, or optical strips and a projector (shown as projector 150) in right temple 110A). The successive field of view of the successive displayed image may include an angle of view between about 15° to 30°, and more specifically 24°, measured horizontally, vertically, or diagonally. The successive displayed image having the successive field of view represents a combined three-dimensional observable area visible through stitching together of two displayed images presented on the first and second image displays.

As used herein, "an angle of view" describes the angular extent of the field of view associated with the displayed images presented on each of the image displays 180C and 180D of optical assemblies 180A and 180B. The "angle of coverage" describes the angle range that a lens of visible light cameras 114A or 114B or infrared camera 220 can image. Typically, the image circle produced by a lens is large enough to cover the film or sensor completely, possibly including some vignetting (i.e., a reduction of an image's brightness or saturation toward the periphery compared to the image center). If the angle of coverage of the lens does not fill the sensor, the image circle will be visible, typically with strong vignetting toward the edge, and the effective angle of view will be limited to the angle of coverage. The "field of view" is intended to describe the field of observable area which the user of the electronic eyewear device 100 can see through his or her eyes via the displayed images presented on the image displays 180C and 180D of the optical assemblies 180A and 180B. Image display 180C of optical assemblies 180A and 180B can have a field of view with an angle of coverage between 15° to 30°, for example 24°, and have a resolution of 480×480 pixels (or greater; e.g., 720p, 1080p, 4K, or 8K).

Figure 3:
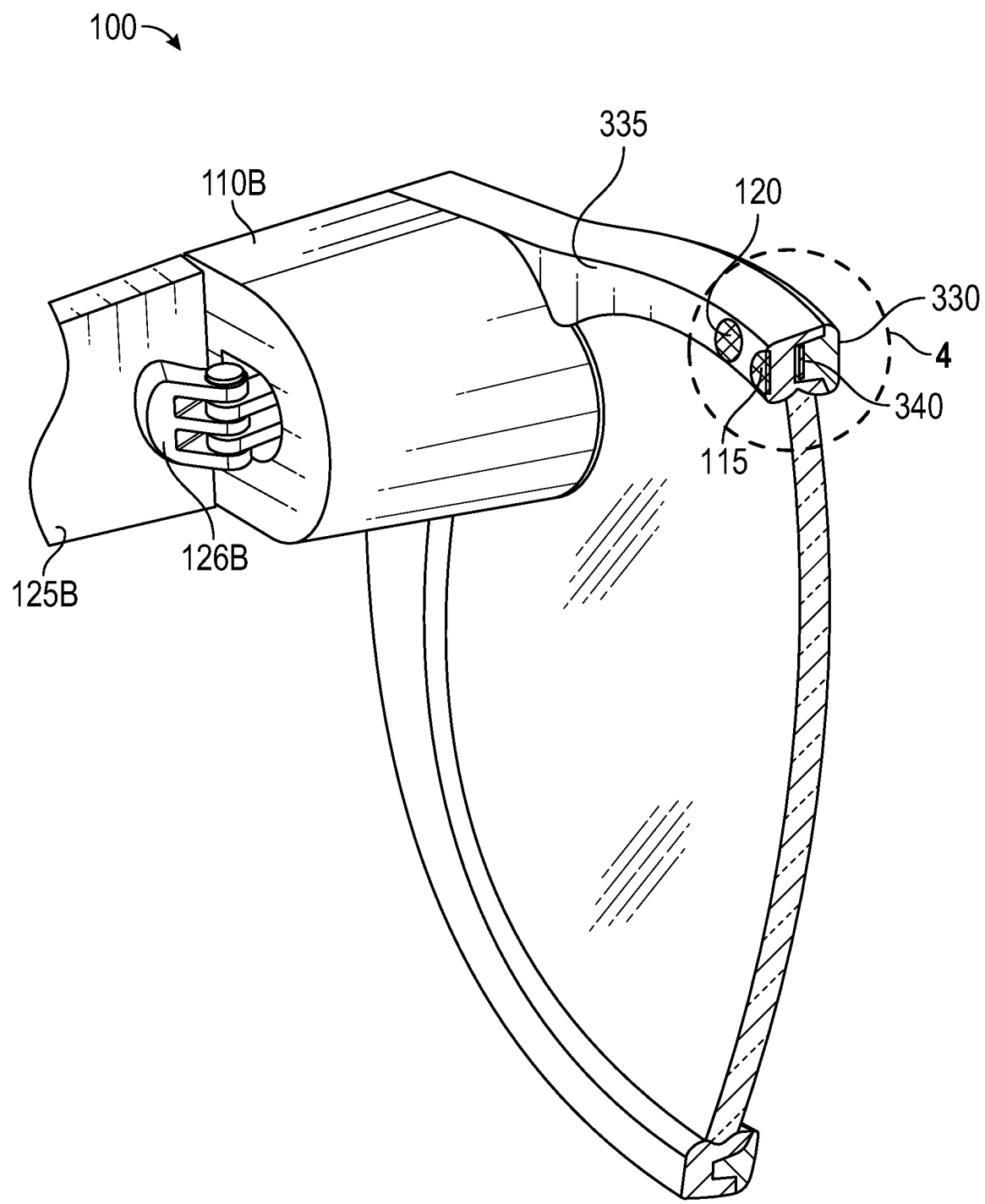
FIG. 3 shows a cross-sectional rear perspective view of the electronic eyewear device of FIG. 2A depicting an infrared emitter, an infrared camera, a frame front, a frame back, and a circuit board.

FIG. 3 shows a cross-sectional rear perspective view of the electronic eyewear device of FIG. 2A. The electronic eyewear device 100 includes the infrared emitter 115, infrared camera 120, a frame front 330, a frame back 335, and a circuit board 340. It can be seen in FIG. 3 that the upper portion of the left rim of the frame of the electronic eyewear device 100 includes the frame front 330 and the frame back 335. An opening for the infrared emitter 115 is formed on the frame back 335.

As shown in the encircled cross-section 4 in the upper middle portion of the left rim of the frame, a circuit board, which is a flexible PCB 340, is sandwiched between the frame front 330 and the frame back 335. Also shown in further detail is the attachment of the left temple portion 110B to the left temple portion 125B via the left hinge 126B. In some examples, components of the eye movement tracker 113, including the infrared emitter 115, the flexible PCB 340, or other electrical connectors or contacts may be located on the left temple 125B or the left hinge 126B.

Figure 4:
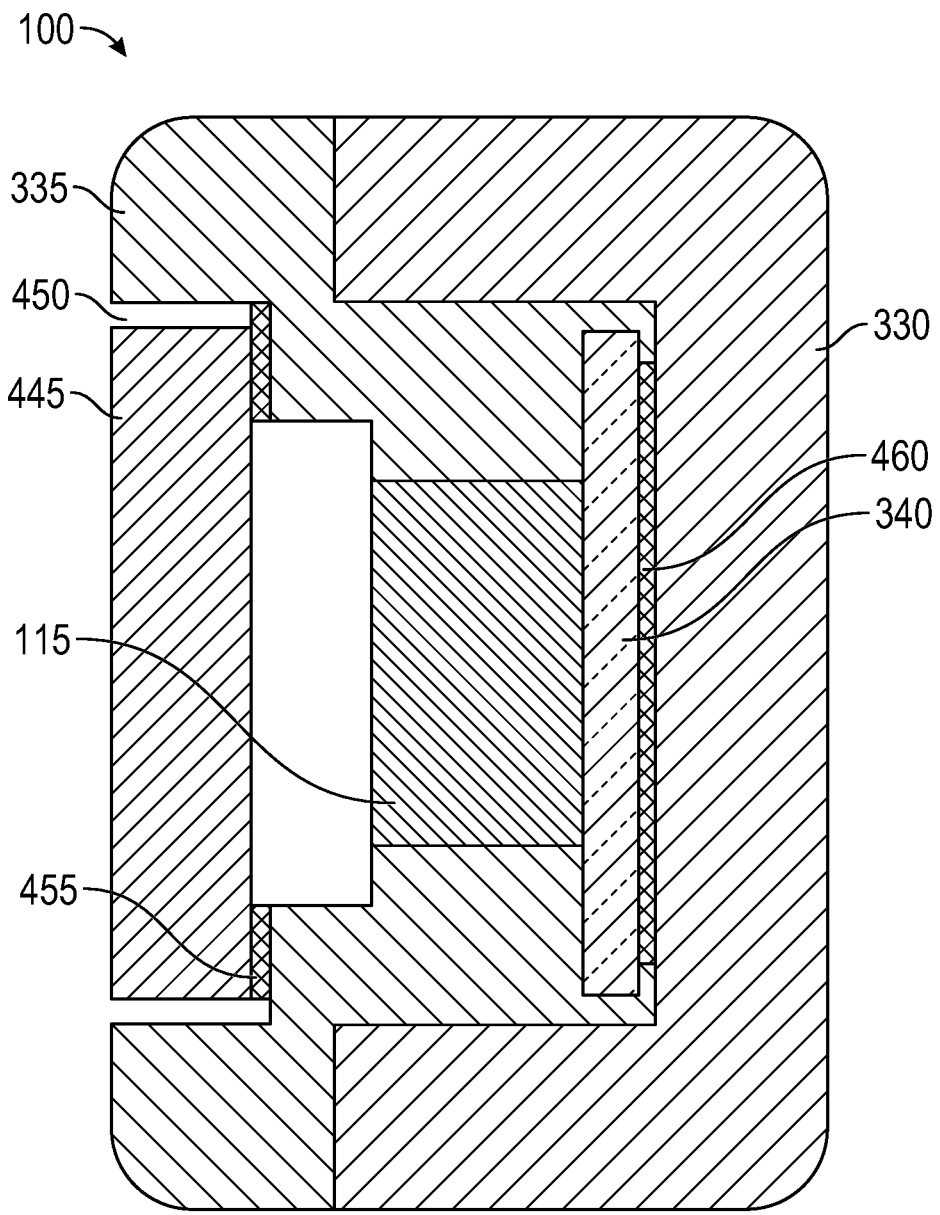
FIG. 4 is a cross-sectional view taken through the infrared emitter and the frame of the electronic eyewear device of FIG. 3.

FIG. 4 is a cross-sectional view through the infrared emitter 115 and the frame corresponding to the encircled cross-section 4 of the electronic eyewear device of FIG. 3. Multiple layers of the electronic eyewear device 100 are illustrated in the cross-section of FIG. 4, as shown the frame includes the frame front 330 and the frame back 335. The flexible PCB 340 is disposed on the frame front 330 and connected to the frame back 335. The infrared emitter 115 is disposed on the flexible PCB 340 and covered by an infrared emitter cover lens 445. For example, the infrared emitter 115 is reflowed to the back of the flexible PCB 340. Reflowing attaches the infrared emitter 115 to contact pad(s) formed on the back of the flexible PCB 340 by subjecting the flexible PCB 340 to controlled heat which melts a solder paste to connect the two components. In one example, reflowing is used to surface mount the infrared emitter 115 on the flexible PCB 340 and electrically connect the two components. However, it should be understood that through-holes can be used to connect leads from the infrared emitter 115 to the flexible PCB 340 via interconnects, for example.

The frame back 335 includes an infrared emitter opening 450 for the infrared emitter cover lens 445. The infrared emitter opening 450 is formed on a rear-facing side of the frame back 335 that is configured to face inwards towards the eye of the user. In the example, the flexible PCB 340 can be connected to the frame front 330 via the flexible PCB adhesive 460. The infrared emitter cover lens 445 can be connected to the frame back 335 via infrared emitter cover lens adhesive 455. The coupling can also be indirect via intervening components.

Figure 5:
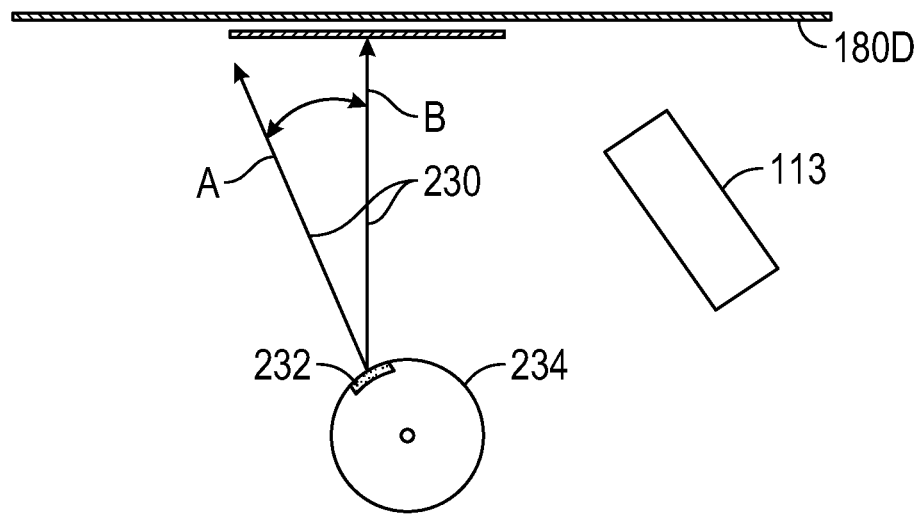
FIG. 5 is a top view illustrating detection of eye gaze direction.
Figure 6:
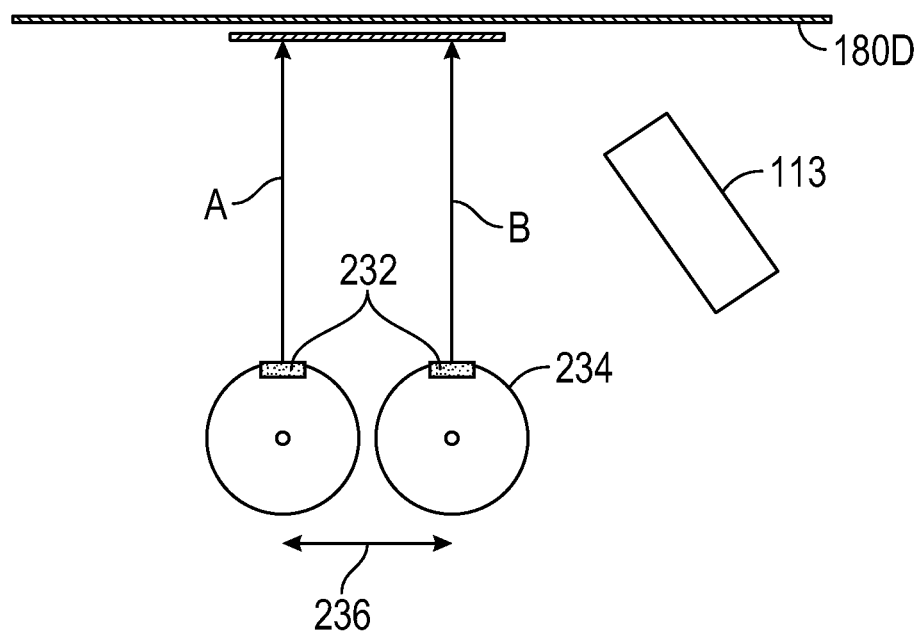
FIG. 6 is a top view illustrating detection of eye position.

In an example, the processor 932 utilizes eye tracker 113 to determine an eye gaze direction 230 of a wearer's eye 234 as shown in FIG. 5, and an eye position 236 of the wearer's eye 234 within an eyebox as shown in FIG. 6. The eye tracker 113 is a scanner which uses infrared light illumination (e.g., near-infrared, short-wavelength infrared, mid-wavelength infrared, long-wavelength infrared, or far infrared) to captured image of reflection variations of infrared light from the eye 234 to determine the gaze direction 230 of a pupil 232 of the eye 234, and also the eye position 236 with respect to a see-through display 180.

Figure 7:
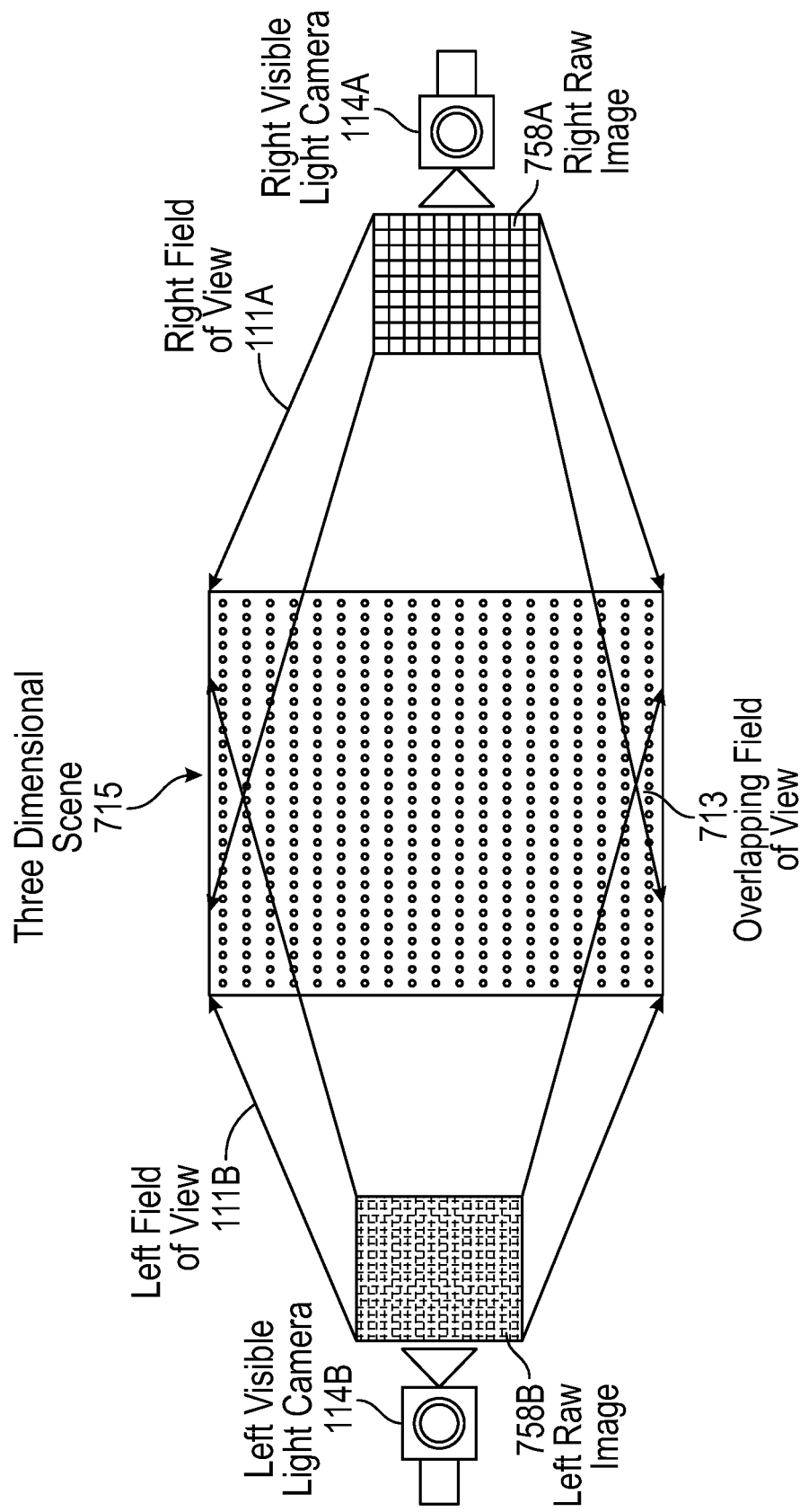
FIG. 7 is a block diagram depicting visible light captured by the visible light cameras as respective raw images.
Figure 9:
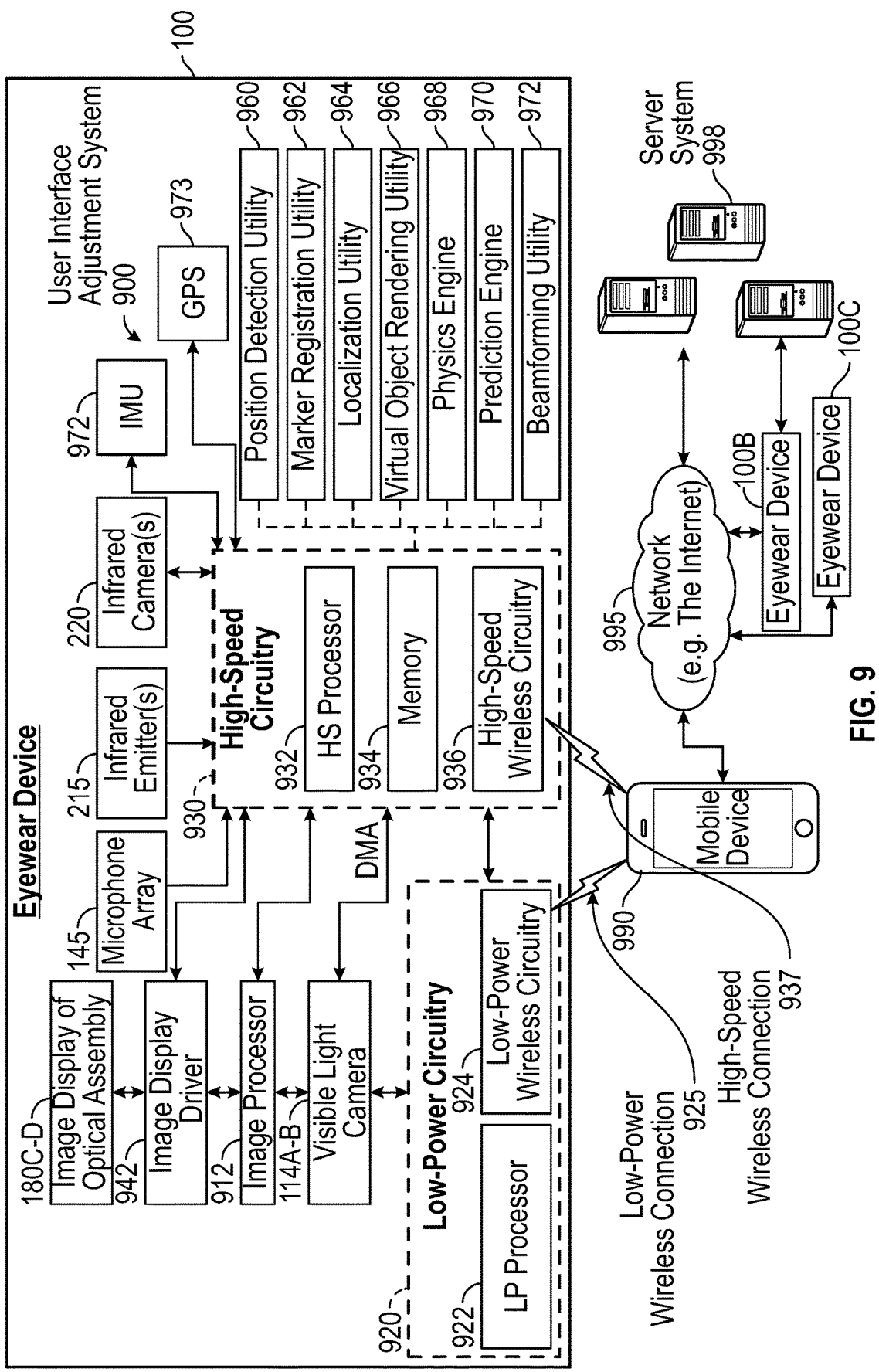
FIG. 9 is a block diagram depicting electronic components of the electronic eyewear device.

The block diagram in FIG. 7 illustrates an example of capturing visible light with cameras 114A and 114B. Visible light is captured by the first visible light camera 114A with a round field of view (FOV) 111A. A chosen rectangular first raw image 758A is used for image processing by image processor 912 (FIG. 9). Visible light is also captured by the second visible light camera 114B with a round FOV 111B. A rectangular second raw image 758B chosen by the image processor 912 is used for image processing by processor 912. The raw images 758A and 758B have an overlapping field of view 713. The processor 912 processes the raw images 758A and 758B and generates a three-dimensional image 715 for display by the displays 180.

Figure 8:
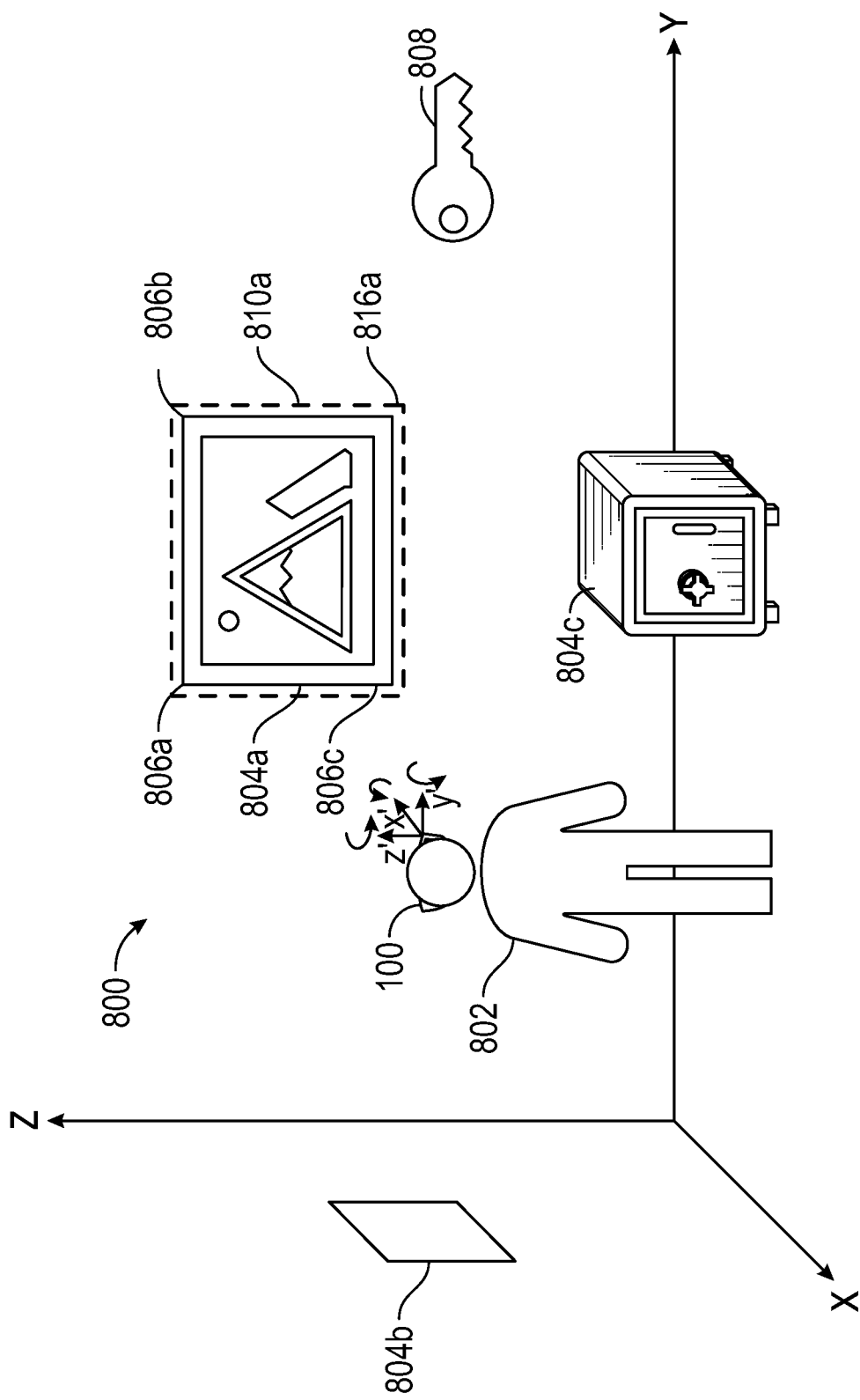
FIG. 8 is a schematic illustration of a user in an example environment.

FIG. 8 depicts an example environment 800 along with elements that are useful for natural feature tracking (NFT; e.g., a tracking application using a simultaneous localization and mapping (SLAM) algorithm. A user 802 of an electronic eyewear device 100 is present in an example physical environment 800 (which, in FIG. 8, is an interior room). The processor 932 of the electronic eyewear device 100 determines its position with respect to one or more objects 804 within the environment 800 using captured images, constructs a map of the environment 800 using a coordinate system (x, y, z) for the environment 800, and determines its position within the coordinate system (FIG. 10) Additionally, the processor 932 determines a head pose (roll, pitch, and yaw) of the electronic eyewear device 100 within the environment by using two or more location points (e.g., three location points 806a, 806b, and 806c) associated with a single object 804a, or by using one or more location points 806 associated with two or more objects 804a, 804b, 804c. The processor 932 of the electronic eyewear device 100 may position a virtual object 808 (such as the key shown in FIG. 8) within the environment 800 for augmented reality viewing via image displays 180.

FIG. 9 depicts a high-level functional block diagram including example electronic components disposed in electronic eyewear 100 and 200. The illustrated electronic components include the processor 932, the memory 934, and the see-through image display 180C and 180D.

Memory 934 includes instructions for execution by processor 932 to implement functionality of electronic eyewear 100/200, including instructions for processor 932 to control in the image 715. Processor 932 receives power from battery (not shown) and executes the instructions stored in memory 934, or integrated with the processor 932 on-chip, to perform functionality of electronic eyewear 100/200, and communicating with external devices via wireless connections.

A user interface adjustment system 900 includes a wearable device, which is the electronic eyewear device 100 with an eye movement tracker 213 (e.g., shown as infrared emitter 215 and infrared camera 220 in FIG. 2B). User interface adjustments system 900 also includes a mobile device 990 and a server system 998 connected via various networks. Mobile device 990 may be a smartphone, tablet, laptop computer, access point, or any other such device capable of connecting with electronic eyewear device 100 using both a low-power wireless connection 925 and a high-speed wireless connection 937. Mobile device 990 is connected to server system 998 and network 995. The network 995 may include any combination of wired and wireless connections.

Electronic eyewear device 100 includes at least two visible light cameras 114A-B (one associated with the left lateral side 170B and one associated with the right lateral side 170A). Electronic eyewear device 100 further includes two see-through image displays 180C-D of the optical assembly 180A-B (one associated with the left lateral side 170B and one associated with the right lateral side 170A). Electronic eyewear device 100 also includes image display driver 942, image processor 912, low-power circuitry 920, and high-speed circuitry 930. The components shown in FIG. 9 for the electronic eyewear device 100 and 200 are located on one or more circuit boards, for example a PCB or flexible PCB, in the temples. Alternatively, or additionally, the depicted components can be located in the temples, frames, hinges, or bridge of the electronic eyewear device 100 and 200. The visible light cameras 114 can include digital camera elements such as a complementary metal-oxide-semiconductor (CMOS) image sensor, charge coupled device, a lens, or any other respective visible or light capturing elements that may be used to capture data, including images of scenes with unknown objects.

Eye movement tracking programming 945 implements the user interface field of view adjustment instructions, including, to cause the electronic eyewear device 100 to track, via the eye movement tracker 213, the eye movement of the eye of the user of the electronic eyewear device 100. Other implemented instructions (functions) cause the electronic eyewear device 100 and 200 to determine the FOV adjustment to the initial FOV 111A-B based on the detected eye movement of the user corresponding to a successive eye direction. Further implemented instructions generate a successive displayed image of the sequence of displayed images based on the field of view adjustment. The successive displayed image is produced as visible output to the user via the user interface. This visible output appears on the see-through image displays 180C-D of optical assembly 180A-B, which is driven by image display driver 942 to present the sequence of displayed images, including the initial displayed image with the initial field of view and the successive displayed image with the successive field of view.

As shown in FIG. 9, high-speed circuitry 930 includes high-speed processor 932, memory 934, and high-speed wireless circuitry 936. In the example, the image display driver 942 is coupled to the high-speed circuitry 930 and operated by the high-speed processor 932 in order to drive the image displays 180C-D of the optical assembly 180A-B. High-speed processor 932 may be any processor capable of managing high-speed communications and operation of any general computing system needed for electronic eyewear device 100. High-speed processor 932 includes processing resources needed for managing high-speed data transfers on high-speed wireless connection 937 to a wireless local area network (WLAN) using high-speed wireless circuitry 936. In certain examples, the high-speed processor 932 executes an operating system such as a LINUX operating system or other such operating system of the electronic eyewear device 100 and the operating system is stored in memory 934 for execution. In addition to any other responsibilities, the high-speed processor 932 executing a software architecture for the electronic eyewear device 100 is used to manage data transfers with high-speed wireless circuitry 936. In certain examples, high-speed wireless circuitry 936 is configured to implement Institute of Electrical and Electronic Engineers (IEEE) 802.11 communication standards, also referred to herein as Wi-Fi. In other examples, other high-speed communications standards may be implemented by high-speed wireless circuitry 936.

Low-power wireless circuitry 924 and the high-speed wireless circuitry 936 of the electronic eyewear device 100 and 200 can include short range transceivers (Bluetooth™) and wireless wide, local, or wide area network transceivers (e.g., cellular or WiFi). Mobile device 990, including the transceivers communicating via the low-power wireless connection 925 and high-speed wireless connection 937, may be implemented using details of the architecture of the electronic eyewear device 100, as can other elements of network 995.

Memory 934 includes any storage device capable of storing various data and applications, including, among other things, color maps, camera data generated by the visible light cameras 114A-B and the image processor 912, as well as images generated for display by the image display driver 942 on the see-through image displays 180C-D of the optical assembly 180A-B. While memory 934 is shown as integrated with high-speed circuitry 930, in other examples, memory 934 may be an independent standalone element of the electronic eyewear device 100. In certain such examples, electrical routing lines may provide a connection through a chip that includes the high-speed processor 932 from the image processor 912 or low-power processor 922 to the memory 934. In other examples, the high-speed processor 932 may manage addressing of memory 934 such that the low-power processor 922 will boot the high-speed processor 932 any time that a read or write operation involving memory 934 is needed.

Server system 998 may be one or more computing devices as part of a service or network computing system, for example, that include a processor, a memory, and network communication interface to communicate over the network 995 with the mobile device 990 and electronic eyewear device 100/200. Electronic eyewear device 100 and 200 is connected with a host computer. For example, the electronic eyewear device 100 is paired with the mobile device 990 via the high-speed wireless connection 937 or connected to the server system 998 via the network 995.

Output components of the electronic eyewear device 100 include visual components, such as the image displays 180C-D of optical assembly 180A-B as described in FIGS. 2C-D (e.g., a display such as a liquid crystal display (LCD), a plasma display panel (PDP), a light emitting diode (LED) display, a projector, or a waveguide). The image displays 180C-D of the optical assembly 180A-B are driven by the image display driver 942. The output components of the electronic eyewear device 100 further include acoustic components (e.g., speakers), haptic components (e.g., a vibratory motor), other signal generators, and so forth. The input components of the electronic eyewear device 100 and 200, the mobile device 990, and server system 998, may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

Electronic eyewear device 100 may optionally include additional peripheral device elements 919. Such peripheral device elements may include ambient light and spectral sensors, biometric sensors, additional sensors, or display elements integrated with electronic eyewear device 100. For example, peripheral device elements 919 may include any I/O components including output components, motion components, position components, or any other such elements described herein. The electronic eyewear device 100 can take other forms and may incorporate other types of frameworks, for example, a headgear, a headset, or a helmet.

For example, the biometric components of the user interface field of view adjustment 900 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components include acceleration sensor components (e.g., accelerometer), gravitation sensor components, rotation sensor components (e.g., gyroscope), and so forth. The position components include location sensor components to generate location coordinates (e.g., a Global Positioning System (GPS) receiver component), WiFi or Bluetooth™ transceivers to generate positioning system coordinates, altitude sensor components (e.g., altimeters or barometers that detect air pressure from which altitude may be derived), orientation sensor components (e.g., magnetometers), and the like. Such positioning system coordinates can also be received over wireless connections 925 and 937 from the mobile device 990 via the low-power wireless circuitry 924 or high-speed wireless circuitry 936.

According to some examples, an "application" or "applications" are program(s) that execute functions defined in the programs. Various programming languages can be employed to create one or more of the applications, structured in a variety of manners, such as object-oriented programming languages (e.g., Objective-C, Java, or C++) or procedural programming languages (e.g., C or assembly language). In a specific example, a third-party application (e.g., an application developed using the ANDROID™ or IOS™ software development kit (SDK) by an entity other than the vendor of the particular platform) may be mobile software running on a mobile operating system such as IOS™, ANDROID™ WINDOWS® Phone, or another mobile operating system. In this example, the third-party application can invoke API calls provided by the operating system to facilitate functionality described herein.

In some examples, the electronic eyewear device 100 includes a collection of motion-sensing components referred to as an inertial measurement unit (IMU) 972. The motion-sensing components may be micro-electro-mechanical systems (MEMS) with microscopic moving parts, often small enough to be part of a microchip. The IMU 972 in some example configurations includes an accelerometer, a gyroscope, and a magnetometer. The accelerometer senses the linear acceleration of the device 100 (including the acceleration due to gravity) relative to three orthogonal axes (x, y, z). The gyroscope senses the angular velocity of the device 100 about three axes of rotation (pitch, roll, yaw). Together, the accelerometer and gyroscope can provide position, orientation, and motion data about the device relative to six axes (x, y, z, pitch, roll, yaw). The magnetometer, if present, senses the heading of the device 100 relative to magnetic north. The position of the device 100 may be determined by location sensors, such as a global positioning system (GPS) unit 973, one or more transceivers to generate relative position coordinates, altitude sensors or barometers, and other orientation sensors. Such positioning system coordinates can also be received over the wireless connections 925, 937 from the mobile device 990 via the low-power wireless circuitry 924 or the high-speed wireless circuitry 936.

The IMU 972 may include or cooperate with a digital motion processor or programming that gathers the raw data from the components and compute a number of useful values about the position, orientation, and motion of the device 100. For example, the acceleration data gathered from the accelerometer can be integrated to obtain the velocity relative to each axis (x, y, z); and integrated again to obtain the position of the device 100 (in linear coordinates, x, y, and z). The angular velocity data from the gyroscope can be integrated to obtain the position of the device 100 (in spherical coordinates). The programming for computing these useful values may be stored in memory 934 and executed by the high-speed processor 932 of the electronic eyewear device 100.

The memory 934 additionally includes, for execution by the processor 932, a position detection utility 960, a marker registration utility 962, a localization utility 964, a virtual object rendering utility 966, a physics engine 968, and a prediction engine 970. The position detection utility 960 configures the processor 932 to determine the position (location and orientation) within an environment, e.g., using the localization utility 964. The marker registration utility 962 configures the processor 932 to register markers within the environment. The markers may be predefined physical markers having a known location within an environment or assigned by the processor 932 to a particular location with respect to the environment within which the electronic eyewear device 100 is operating or with respect to the electronic eyewear itself. The localization utility 964 configures the processor 932 to obtain localization data for use in determining the position of the electronic eyewear device 100, virtual objects presented by the electronic eyewear device, or a combination thereof. The location data may be derived from a series of images, the IMU unit 972, the GPS unit 973, or a combination thereof. The virtual object rendering utility 966 configures the processor 932 to render virtual images for display by the image display 180C-D under control of the image display driver 942 and the image processor 912. The physics engine 968 configures the processor 932 to apply laws of physics such as gravity and friction to the virtual word, e.g., between virtual game pieces. The prediction engine 970 configures the processor 932 to predict anticipated movement of an object such as the electronic eyewear device 100 based on its current heading, input from sensors such as the IMU 972, images of the environment, or a combination thereof.

Figure 11:
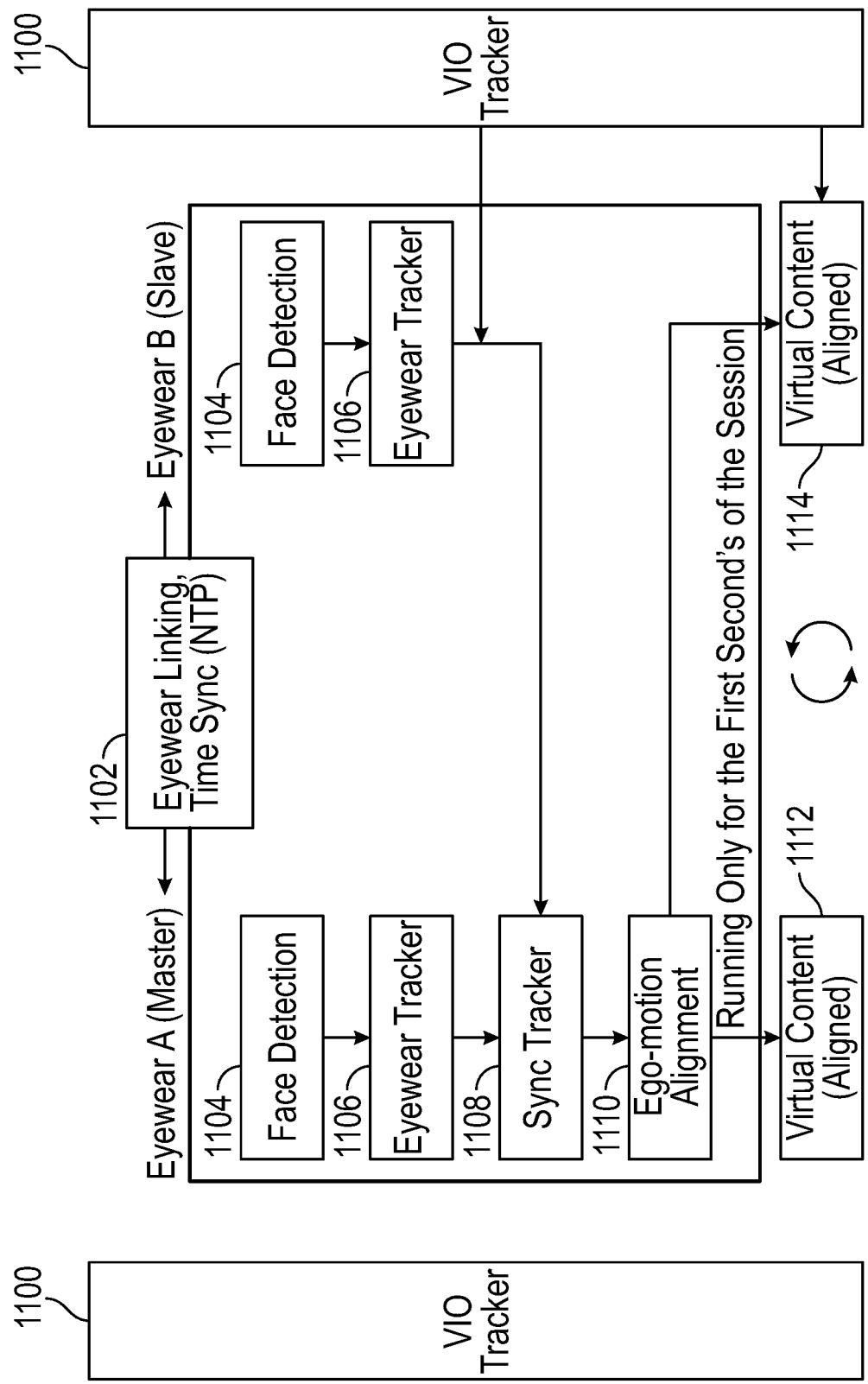
FIG. 11 is a block diagram of a system for aligning the electronic eyewear devices.

The memory 934, having instructions for execution by the processor 932, additionally includes a beamforming utility 972 that configures the processor 932 to unmix audio signals from the microphone array 145 by using the tracking data of remote electronic eyewear and the signals from the microphone array 145. The location and orientation data of other electronic eyewear devices 100 is provided by six degrees of freedom (6DOF) alignment (FIG. 11). The beamforming utility 972 additionally configures the processor 932 to determine the direction of arrival (DOA) of sounds present in the environment using the microphone array 145.

The processor 932 within the electronic eyewear device 100 may construct a map of the environment surrounding the electronic eyewear device 100, determine a location of the electronic eyewear device within the mapped environment, and determine a relative position of the electronic eyewear device to one or more objects in the mapped environment. The processor 932 may construct the map and determine location and position information using a simultaneous localization and mapping (SLAM) algorithm applied to data received from one or more sensors. In the context of augmented reality, the SLAM algorithm is used to construct and update a map of an environment, while simultaneously tracking and updating the location of a device (or a user) within the mapped environment. The mathematical solution can be approximated using various statistical methods, such as particle filters, Kalman filters, extended Kalman filters, and covariance intersection.

Sensor data includes images received from one or both of the cameras 114A, 114B, distance(s) received from a laser range finder, positional information received from GPS 973 and IMU 972, positional information received from the GPS and IMU of a mobile device 990, or a combination of two or more of such sensor data, or from other sensors providing data useful in determining positional information.

Figure 10:
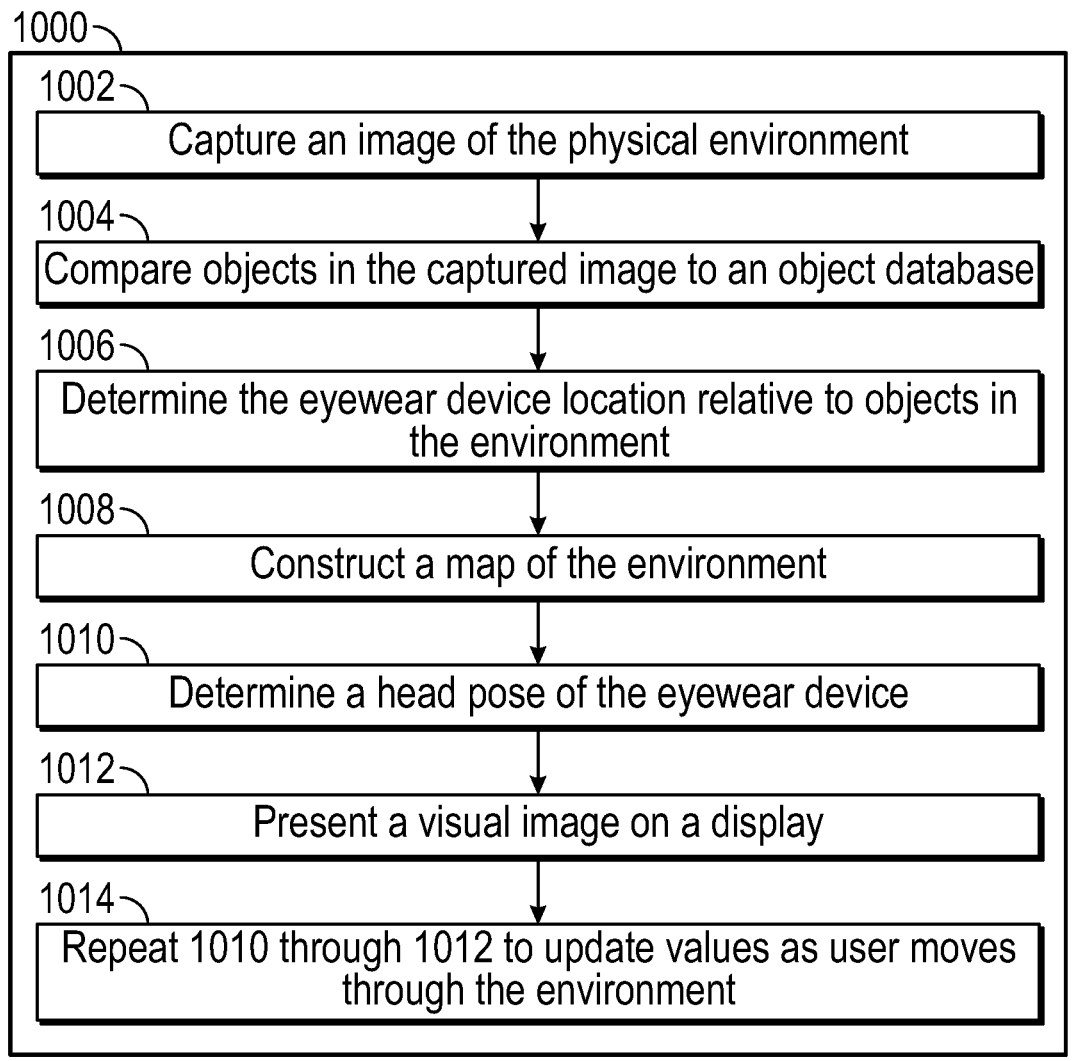
FIG. 10 is a flow chart illustrating an example method of displaying virtual objects in a physical environment.

FIG. 10 is a flow chart 1000 depicting a method for implementing augmented reality applications described herein on a wearable device (e.g., an electronic eyewear device). Although the steps are described with reference to the electronic eyewear device 100, as described herein, other implementations of the steps described, for other types of devices, will be understood by one of skill in the art from the description herein. Additionally, it is contemplated that one or more of the steps shown in FIG. 10, and in other figures, and described herein may be omitted, performed simultaneously or in a series, performed in an order other than illustrated and described, or performed in conjunction with additional steps.

At block 1002, the electronic eyewear device 100 captures one or more input images of a physical environment 800 near the electronic eyewear device 100. The processor 932 may continuously receive input images from the visible light camera(s) 114 and store those images in memory 934 for processing. Additionally, the electronic eyewear device 100 may capture information from other sensors (e.g., location information from a GPS unit 973, orientation information from an IMU 972, or distance information from a laser distance sensor).

At block 1004, the electronic eyewear device 100 compares objects in the captured images to objects stored in a library of images to identify a match. In some implementations, the processor 932 stores the captured images in memory 934. A library of images of known objects is stored in the memory 934.

In one example, the processor 932 is programmed to identify a predefined particular object (e.g., a particular picture 804a hanging in a known location on a wall, a window 804b in another wall, or an object such as a safe 804c positioned on the floor). Other sensor data, such as GPS data, may be used to narrow down the number of known objects for use in the comparison (e.g., only images associated with a room identified through GPS coordinates). In another example, the processor 932 is programmed to identify predefined general objects (such as one or more trees within a park).

At block 1006, the electronic eyewear device 100 determines its position with respect to the object(s). The processor 932 may determine its position with respect to the objects by comparing and processing distances between two or more points in the captured images (e.g., between two or more location points on one object 804 or between a location point 806 on each of two objects 804) to known distances between corresponding points in the identified objects. Distances between the points of the captured images greater than the points of the identified objects indicates the electronic eyewear device 100 is closer to the identified object than the imager that captured the image including the identified object. On the other hand, distances between the points of the captured images less than the points of the identified objects indicates the electronic eyewear device 100 is further from the identified object than the imager that captured the image including the identified object. By processing the relative distances, the processor 932 is able to determine the position within respect to the objects(s). Alternatively, or additionally, other sensor information, such as laser distance sensor information, may be used to determine position with respect to the object(s).

At block 1008, the electronic eyewear device 100 constructs a map of an environment 800 surrounding the electronic eyewear device 100 and determines its location within the environment. In one example, where the identified object (block 1004) has a predefined coordinate system (x, y, z), the processor 932 of the electronic eyewear device 100 constructs the map using that predefined coordinate system and determines its position within that coordinate system based on the determined positions (block 1006) with respect to the identified objects. In another example, the electronic eyewear device constructs a map using images of permanent or semi-permanent objects 804 within an environment (e.g., a tree or a park bench within a park). In accordance with this example, the electronic eyewear device 100 may define the coordinate system (x', y', z') used for the environment.

At block 1010, the electronic eyewear device 100 determines a head pose (roll, pitch, and yaw) of the electronic eyewear device 100 within the environment. The processor 932 determines head pose by using two or more location points (e.g., three location points 806a, 806b, and 806c) on one or more objects 804 or by using one or more location points 806 on two or more objects 804. Using conventional image processing algorithms, the processor 932 determines roll, pitch, and yaw by comparing the angle and length of a lines extending between the location points for the captured images and the known images.

At block 1012, the electronic eyewear device 100 presents visual images to the user. The processor 932 presents images to the user on the image displays 180C-D using the image processor 912 and the image display driver 942. The processor develops and presents the visual images via the image displays responsive to the location of the electronic eyewear device 100 within the environment 800.

At block 1014, the steps described above with reference to blocks 1006-1012 are repeated to update the position of the electronic eyewear device 100 and what is viewed by the user 802 as the user moves through the environment 800.

Referring again to FIG. 8, the method of implementing interactive augmented reality applications described herein, in this example, includes a virtual marker 810a associated with a virtual object(s) 808 in the environment 800. In an AR system, markers are registered at locations in the environment to assist devices with the task of tracking and updating the location of users, devices, and objects (virtual and physical) in a mapped environment. Markers are sometimes registered to a high-contrast physical object, such as the relatively dark object 804a mounted on a lighter-colored wall, to assist cameras and other sensors with the task of detecting the marker. The markers may be preassigned or may be assigned by the electronic eyewear device 100 upon entering the environment.

Markers can be encoded with or otherwise linked to information. A marker might include position information, a physical code (such as a bar code or a QR code; either visible to the user or hidden), or a combination thereof. A set of data associated with the marker is stored in the memory 934 of the electronic eyewear device 100. The set of data includes information about the marker 810a, the marker's position (location and orientation), one or more virtual objects, or a combination thereof. The marker position may include three-dimensional coordinates for one or more marker landmarks 816a, such as the corner of the generally rectangular marker 810a shown in FIG. 8. The marker location may be expressed relative to real-world geographic coordinates, a system of marker coordinates, a position of the electronic eyewear device 100, or other coordinate system. The one or more virtual objects associated with the marker 810a may include any of a variety of material, including still images, video, audio, tactile feedback, executable applications, interactive user interfaces and experiences, and combinations or sequences of such material. Any type of content capable of being stored in a memory and retrieved when the marker 810a is encountered or associated with an assigned marker may be classified as a virtual object in this context. The key 808 shown in FIG. 8, for example, is a virtual object displayed as a still image, either 2D or 3D, at a marker location.

In one example, the marker 810a may be registered in memory as being located near and associated with a physical object 804a (e.g., the framed work of art shown in FIG. 8). In another example, the marker may be registered in memory as being a particular position with respect to the electronic eyewear device 100.

FIG. 11 illustrates an example of establishing a collaborative AR experience between users of electronic eyewear devices 100 by using alignment between respective trajectories (e.g., in 6DOF) generated by pose trackers 1100 (e.g., 6DOF pose trackers. In one example, the pose tracker comprises a visual inertial odometry (VIO) pose tracker, although other types of pose trackers can be used as well. Electronic eyewear device 100A of user A and the electronic eyewear device 100B of user B track the electronic eyewear device of the other user, or an object of the other user, such as on the user's face, to provide the collaborative AR experience. This enables sharing common 3D content between multiple electronic eyewear users without using or aligning to common image content such as a marker as described with reference to FIG. 8, which is a more lightweight solution with reduced computational burden on processor 932. It is sufficient to run a local odometry system on every electronic eyewear device 100 along with cross-tracking of devices or faces to avoid the full global mapping pipeline, which saves memory as well as computational resources. This allows users of electronic eyewear devices 100 to add virtual 3D content and see the 3D content properly positioned through their electronic eyewear device 100. Each user can simultaneously modify the virtual 3D content. This disclosure also prevents piracy issues as it does not require sharing of images between electronic eyewear devices 100. Users only need to be able to see the other user for a short time period from roughly frontal positions.

The ego-motion alignment method is novel as the electronic eyewear devices 100 (or any rigidly mounted part or feature, like a wearer's face) are shortly seen by each other electronic eyewear devices 100. Ego-motion alignment provides unique information and sufficient constraints to solve the alignment problem, as it does not require each electronic eyewear device to see the same part of a scene such as described with reference to FIG. 8.

In this example, a system and method of aligning the electronic eyewear devices 100 of two users, user A and user B, is described, although any number of users is possible in this disclosure.

Each of user A and user B starts her/his electronic eyewear device 100A and 100B wherein the respective processor 932 runs in the background the 6DOF pose tracker 1100 to track a trajectory (position) of the respective electronic eyewear device 100A and 100B. The 6DOF pose tracker 1100 is a 3D or VIO pose tracker that tracks the device pose in six degrees of freedom (x, y, z, pitch, yaw, roll) using IMU 972 and camera images 758A and 758B to estimate the pose of the respective IMU 972. The IMU 972 is the reference body, not the cameras, and thus the full pose of the user is determined at any time, including regular timestamps. The full 6DOF pose of the user stands for the translation and orientation of the IMU 972, expressed in the coordinate system with its origin at the beginning of the operation of the electronic eyewear device 100. In the case of smart glasses including electronic eyewear device 100, the IMU 972 and one or more cameras 114A and 114B are rigid parts of the electronic eyewear device 100, where the rigid transformation is known via an electronic eyewear device calibration process. This means that the VIO pose reflects the pose (position and orientation) of the wearer's face in 3D space. An off-the-shelf VIO pose tracker can be used for the purpose of the ego-motion alignment method. There are commercially available VIO pose trackers, such as the ARCore™ from Google® of Mountain View, California, and the ARKit™ from Apple® of Cupertino, California.

The two electronic eyewear devices 100 have synchronized clocks and so the time-synched VIO poses are synched, done, e.g., by Network Time Protocol (NTP) 1102 which is a known networking protocol for clock synchronization between computer systems over packet-switched, variable-latency data networks.

The VIO pose trackers 1100 are gravity aligned. This means that one of their coordinate axes (typically z-coordinate) is oriented towards the earth's center. The IMU 972 determines gravity alignment. The remaining rotational ambiguity to be estimated is thus only one-dimensional. Thus, only one angle needs to be estimated for the orientational part of the alignment transformation. For the translational part, three numbers (x, y, z), need to be estimated. For rotation angles, the alignment of the "roll" and "pitch" angle is implicitly done because of the initialization of each VIO pose tracking system 1100 against the gravity. However, each VIO initialization has a "yaw" angle ambiguity, which is resolved as follows.

The processor 932 of each wearer's electronic eyewear device 100 starts a face detection method using a face detector 1104. An off-the-shelf method (such as a computer vision algorithm implementing an eigen face technique) can be used by the processor 932 and cameras 114A and 114B to detect the face of the other electronic eyewear device user.

There are two options for the ego-motion alignment. According to one option, as the face detector 1104 runs, the processor 932 picks a fixed point P1 on a symmetry plane on the other user's face, e.g., a nose, chin, etc., and its x,y coordinates in each image 758A and 758B (e.g., at 30 fps rate) is output for further processing. The symmetry plane is important to constraint enough the problem and make it solvable. In this case, one additional unknown is added into the system, a lever arm distance of the IMU 972 of the other electronic eyewear device to the point P1, such as the distance from the IMU 972 to the user's nose in this example.

In a second option, the processor 932 uses the face detection of the first option, e.g., a bounding box of the face in the image 758A and 758B to initialize a more accurate electronic eyewear device 100 tracker 1106. A full 3D model, such as a computer aided design (CAD) model, of the electronic eyewear device 100 is known and may be stored in memory 934 of the electronic eyewear devices 100, e.g., by the manufacturer, and the processor 932 runs a more sophisticated and accurate tracking algorithm to track a point P2 on the electronic eyewear device 100 instead of on the face. In this case, the lever arm additional unknown is eliminated as the relation of the tracked point P2 on the electronic eyewear device 100 to the IMU 972 is known using the CAD model. Both options are solvable, but the second option possesses higher robustness against the noise on the tracked points. Again, knowing the x,y coordinates of point P2 in some camera images 758A and 758B is where the detection succeeds.

For a pose for each camera image (in a global shutter camera) or image line (in a rolling shutter camera) the processor 932 detects a face feature P1 of the other user or the electronic eyewear device feature P2 of the other user along with their x,y image coordinates. This detection is performed by the processor 932 of each electronic eyewear device 100 for user A and user B. It is not mandatory for each electronic eyewear device 100 to simultaneously see the other electronic eyewear device 100 or user. This means that user A can see user B, for example, in the first 5 seconds, then there might be a time gap of not seeing each other at all, then the user B sees user A shortly, then the user A again sees user B gain, and so on. The face/electronic eyewear tracklets, which are fragments of the track followed by the respective moving electronic eyewear device 100, with their corresponding 6DOF VIO poses are sent over to server system 998, or to the other electronic eyewear device 100 where the processing happens.

The x,y coordinates of the user face or electronic eyewear device tracklets generated by trackers 1106 and their corresponding 6DOF poses of the gravity aligned and time synchronized VIO pose trackers 1108 are used by processor 932 to build matrices to arrive at a Quadratic Eigenvalue Problem (QEP). QEP is a well understood problem in Linear Algebra and can be solved by processor 932 in a closed form as a generalized Eigenvalue Problem. Solving a QEP using processor 932 requires only tracks with 3 or 4 positions. The minimal solver needs 4 points (in case of face feature tracking) or 3 points (in case of electronic eyewear device tracking) which allows it to be embedded into a robust estimation procedure. QEP allows for over constrained as well as for minimal solution.

The output of the QEP is the yaw-angle difference and the 3D translation of the alignment transformation. In the case of tracking the face point P1 (e.g., nose), in addition, the 3D lever arm unknown vector per user is estimated too.

The electronic eyewear ego motion alignment transformation 1110 can be estimated in a few seconds, but as more new face/electronic eyewear detections become available, the estimate can be refined and thus be more accurate.

The refinement can be viewed as solving the over constrained QEP or more accurate non-linear optimization. The non-linear optimization can be formulated either as a gradient descent-based minimizer with sparse matrices, or as a Gaussian Loopy Belief Propagation on a factor graph, both with robust kernels to cope with outliers.

Once the ego motion alignment transformation 1110 is estimated by processor 932, it allows processor 932 to transform a virtual 3D content 1112 from a local coordinate system of one user/electronic eyewear device to another user/electronic eyewear device at 1114. The same virtual 3D content 1112 can then be projected and properly rendered into the electronic eyewear device 100 of both users such that the projected 3D content is synchronized and properly displayed i.e., rendered from the correct viewpoint per user.

Figure 12:
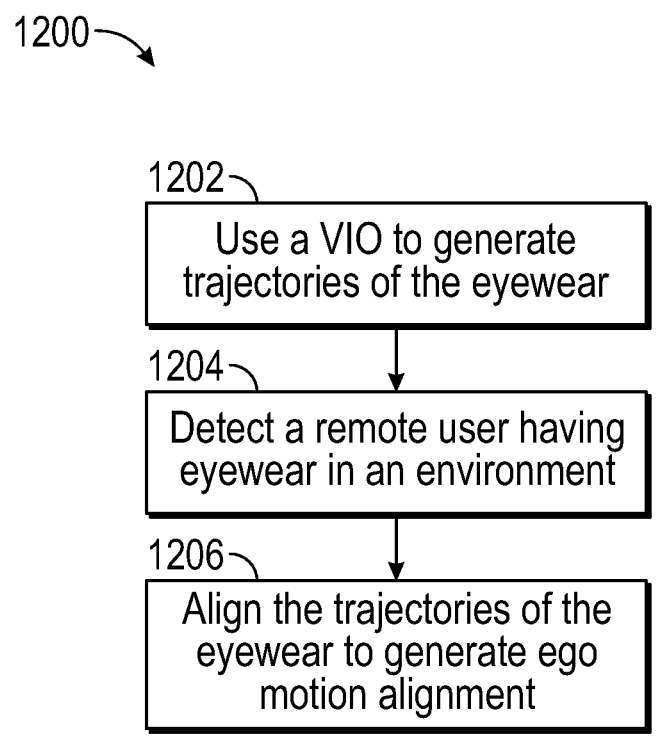
FIG. 12 is a flow chart illustrating aligning the electronic eyewear devices.

FIG. 12 is a flow chart 1200 depicting a method for implementing augmented reality applications including aligning VIO trajectories of an electronic eyewear device with VIO trajectories of the remote electronic eyewear device to generate ego motion alignment of the electronic eyewear devices. Although the steps are described with reference to the electronic eyewear device 100, as described herein, other implementations of the steps described, for other types of devices, will be understood by one of skill in the art from the description herein. Additionally, it is contemplated that one or more of the steps shown in FIG. 12, and in other figures, and described herein may be omitted, performed simultaneously or in a series, performed in an order other than illustrated and described, or performed in conjunction with additional steps.

At block 1202, the processor 932 of electronic eyewear device 100A uses the VIO pose tracker 1100 to generate trajectories of the electronic eyewear device 100A. The VIO pose tracker 1100 is a 6DOF pose tracker that tracks the head pose of user A in six degrees of freedom (x, y, z, pitch, yaw, roll) using IMU 972 and camera images 758A and 758B to estimate the pose of the respective IMU 972. The IMU 972 is the reference body, not the cameras, and thus the full pose of the user is determined at regular time instants. The full 6DOF pose of the user stands for the translation and orientation of the IMU 972, expressed in the coordinate system with its origin at the beginning of the operation of the electronic eyewear device 100A. In the case of smart glasses including electronic eyewear device 100, the IMU 972 and one or more cameras 114A and 114B are rigid parts of the electronic eyewear device 100, where the rigid transformation is known via an electronic eyewear device calibration process. This means that the VIO pose reflects the pose (position and orientation) of the wearer's face in 3D space.

At block 1204, the processor 932 uses face detector 1104 of electronic eyewear device 100A to detect a remote user B wearing the remote electronic eyewear device 100B in an environment, wherein the remote electronic eyewear device 100B is also configured to generate trajectories using the remote VIO pose tracker 1100. The processor 932 uses cameras 114A and 114B to detect the face of the other electronic eyewear device user. For a pose for each camera image (in a global shutter camera) or image line (in a rolling shutter camera) the processor 932 detects a face feature P1, or the electronic eyewear device feature P2, along with their x,y image coordinates. This detection is performed by the processor 932 of each electronic eyewear device 100A and 100B for user A and user B. It is not mandatory for each electronic eyewear device 100 to simultaneously see the other electronic eyewear device 100 or user. This means that user A can see user B, for example, in the first 5 seconds, then there might be a time gap of not seeing each other at all, then the user B sees user A shortly, then the user A again sees user B again, and so on.

At block 1206, the processor 932 of electronic eyewear device 100A aligns the VIO trajectories of the electronic eyewear device 100A with VIO trajectories of the remote electronic eyewear device 100B to generate ego motion alignment of the electronic eyewear device 100A with the remote electronic eyewear device 100B. There are at least two options for the ego-motion alignment. According to one option, as the face detector 1104 runs, the processor 932 picks a fixed point P1 on a symmetry plane on the other user's face, e.g., a nose, chin, etc., and its x,y coordinates in each image 758A and 758B (e.g., at 30 fps rate) is output for further processing. The symmetry plane is important to constrain enough the problem and make it solvable. In this case, one additional unknown is added into the system, a lever arm distance of the IMU 972 to the point P1, such as the distance from the IMU 972 to the user's nose in this example. It stems from the fact that this lever arm distance is unique but unknown for each user.

In a second option, the processor 932 uses the face detection of the first option, e.g., a bounding box of the face in the image 758A and 758B to initialize a more accurate electronic eyewear device 100 detector 1106. A full 3D model, such as a computer aided design (CAD) model, of the electronic eyewear device 100 is known and stored in memory 934 as the electronic eyewear devices 100 are made by the same manufacturer, and the processor 932 runs a more sophisticated and accurate tracking algorithm to track a point P2 on the electronic eyewear device 100 instead of on the face. In this case, the lever arm additional unknown is eliminated as the relation of the tracked point P2 on the electronic eyewear device 100 to the IMU 972 is known using the CAD model. Both options are solvable, but the second option possesses higher robustness against the noise on the tracked points. Again, knowing the x,y coordinates of point P2 in some camera images 758A and 758B is where the detection succeeds.

Figure 13:
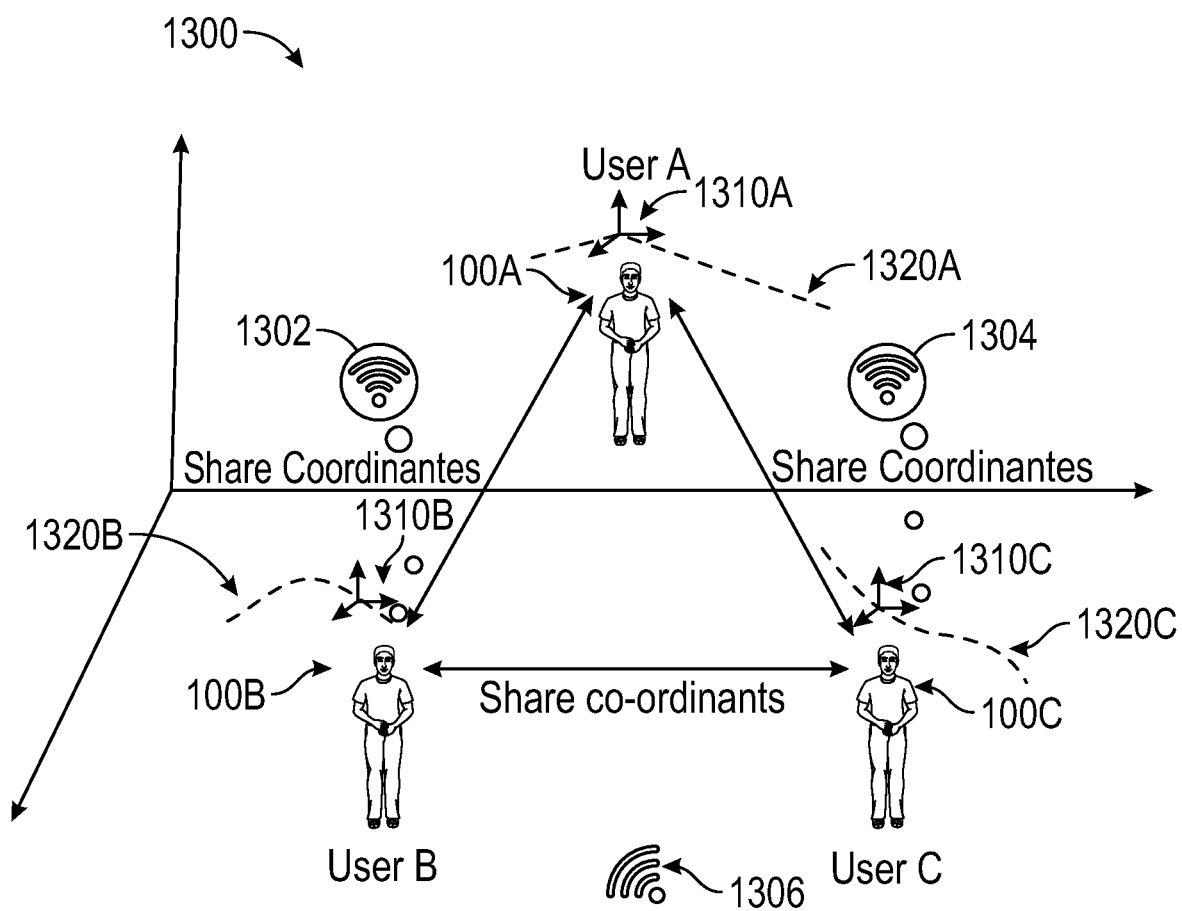
FIG. 13 is a schematic illustration of multiple users in an example environment having aligned trajectories and illustrating audio source separation.

As described with respect to FIG. 8 and FIG. 13, a first electronic eyewear device 100A operated by a user A, and a second electronic eyewear device 100B operated by a user B, can each determine its (x, y, z) position in an environment 1300, shown as interior room, using the SLAM algorithm described. Multiple electronic eyewear devices 100 can determine their position in the same coordinate system for multi-player interaction, such as user C having a third electronic eyewear 100C, and limitation to two electronic eyewear devices 100 in environment 1300 is not to be inferred. Each electronic eyewear device 100A and 100B can share its (x, y, z) position via messaging using short range communication techniques via wireless circuitry 924, such as Bluetooth® and WiFi, or via wireless circuitry 936 and network 995 (FIG. 9).

Optionally, to perform ego-motion alignment, the processor 932 of each user electronic eyewear device 100 also determines a physical attribute of a user of another electronic eyewear device 100, such as a face or head, in the interior room. The processor 932 is configured to identify the physical attribute in the plurality of frames generated by cameras 114A and 114B. For example, the processor 932 uses facial recognition software to determine the face or mouth of the other user. The electronic eyewear device 100 may also store face images in a library of images, such as in a database, to perform automatic identification of another user by comparing a detected face image to the database of images for a match.

In one example, when the electronic eyewear devices 100A and 100B are in a session, and communicating with each other, such as via network 995 or directly using a low power signal such as based on Bluetooth™, the respective (x, y, z) coordinate positions of each electronic eyewear device 100 are shared with the other electronic eyewear devices(s) automatically.

In another example, the electronic eyewear device 100 of one user can share its (x, y, z) coordinate position with the other electronic eyewear device 100 by using mobile device 990. For example, electronic eyewear device 100B of user B can share its (x, y, z) coordinate position with electronic eyewear device 100A using the synched mobile device 990 of user B.

Multiple electronic eyewear devices 100 can determine their position in the same coordinate system for multi-player interaction, and limitation to two electronic eyewear devices 100 in environment 1100 is not to be inferred. Each electronic eyewear device 100A and 100B can share its (x, y, z) position via messaging using short range communication techniques via wireless circuitry 924, such as Bluetooth® and WiFi, or via wireless circuitry 936 and network 995 (FIG. 9).

FIG. 13 further illustrates using the determined position of the electronic eyewear devices 100A-C performed in conjunction with the microphone array 145 of the electronic eyewear device 100 unmixing voices/sounds from the surrounding environment of the user by using the beamforming utility 972 (FIG. 9). Many audio, and audiovisual applications in AR require the unmixing of voices/sounds and/or estimating the direction of arrival (DOA) of the sounds. The problem of unmixing voices becomes more complex when audio sources are moving, and their positions are unknown. This problem is solved by using the known 3D position/orientations of multiple electronic eyewear users to simplify the audio source separation model to help voice/sound unmixing.

The 6DOF tracker 1100 is running on every electronic eyewear device and tracks the ego-motion 1320A-C of itself. The 3D position and orientation of electronic eyewear device 100B and electronic eyewear device 100C are known to electronic eyewear device 100A's coordinate system 1310A by the alignment of the coordinate systems 1310A, 1310B, 1310C of the 6DOF trackers. Alignment may be done by using the method described with reference to FIG. 11. In one embodiment, constant visual tracking of remote users is not required. The alignment of the coordinate systems of the 6DOF trackers happens once in the beginning of the AR session. Each 6DOF tracker provides the 6D pose of every user within a common coordinate system. From the initial alignment and ego motion data, the relative location between the subjects is known at any time, even if the subjects are moving.

The microphone array 145 of electronic eyewear device 100A of User A receives a mixture of voices and sounds; a voice 1302 of User B, a voice 1304 of User C, and background noise 1306. The 3D position of sound sources, for example the lips of User B and User C, is approximated through the position of the respective electronic eyewear devices 100B and 100C. This is done by using a simple face model, the position of the lips with respect to the electronic eyewear device 100 can be accurately estimated. By utilizing the alignment of the 6DOF trackers, the system knows the position and orientation of the sources of voices 1302 and 1304 with high accuracy. This results in the audio separation model used by the beamforming utility 972 to be simplified. The model is reduced to audio source separation using the known positions and orientation of the sound sources generating voices 1302 and 1304. Additionally, the known relative motion and position of the sources allows for the elimination of sounds from distant sources as determined by the microphone array 145 when isolating the voices of other users of the electronic eyewear 100 and users without electronic eyewear. In one example, User B is at a 7 o'clock angle and User C is at a 4 o'clock angle relative to User A. If User C is at a distance of 6 meters and User B is at distance of 2 meters relative to User A, aligned ego motions provide this data to the beamformer utility 972 to apply a different focus on the microphone array 145 to simplify the unmixing of audio signals.

In another example, User A is additionally wearing a pair of earbuds coupled to the electronic eyewear device 100. User A is interested in hearing a voice from User B and not from User C or the background. The beamforming direction is dynamically focused on the direction of User B and relays an isolated/cleaned voice of User B. The User A may select a desired direction to isolate sound by interacting with the temple of the electronic eyewear or the paired earbud. This is similar to a human's natural behavior to try to hear in a particular direction by placing a hand on the ear.

Figure 14:
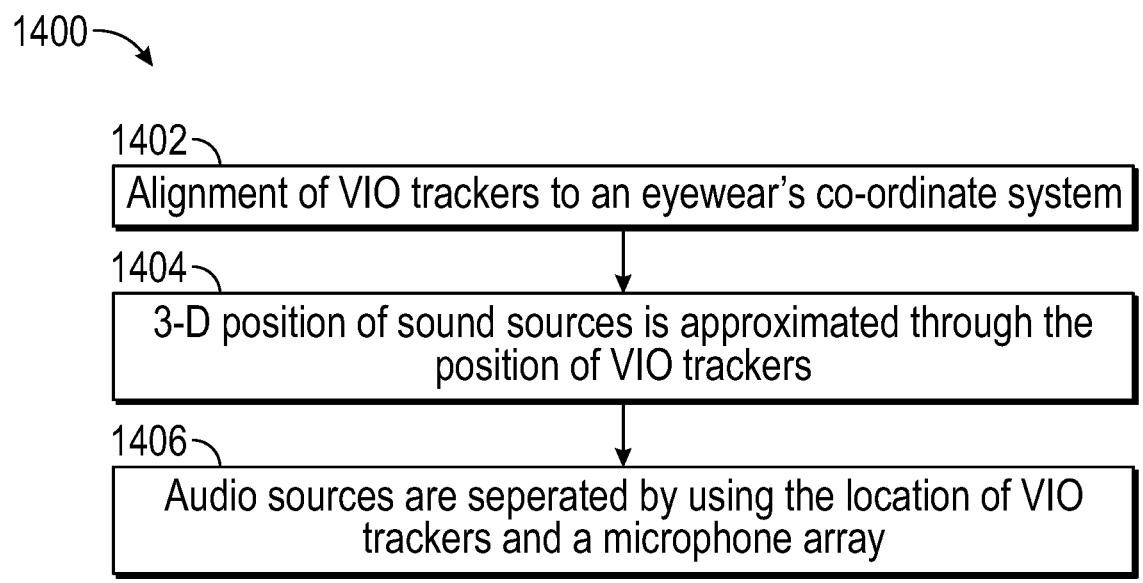
FIG. 14 is a flow chart illustrating using aligned trajectories to separate audio signals from different audio sources.

FIG. 14 is a flow chart depicting a method 1400 of using aligned VIO trajectories of an electronic eyewear and one or more remote electronic eyewear devices to perform audio source unmixing. Although the steps are described with reference to the electronic eyewear device 100, as described herein, other implementations of the steps described, for other types of devices, will be understood by one of skill in the art from the description herein. Multiple electronic eyewear devices 100 can determine their position in the same coordinate system for multi-user interaction, and limitation to two electronic eyewear devices 100 for the use in audio source unmixing is not to be inferred. Additionally, it is contemplated that one or more of the steps shown in FIG. 14, and in other figures, and described herein may be omitted, performed simultaneously or in a series, performed in an order other than illustrated and described, or performed in conjunction with additional steps.

At block 1402, the processor 932 of electronic eyewear device 100A aligns the VIO trajectories of the electronic eyewear device 100A with VIO trajectories of the remote electronic eyewear device 100B to generate ego motion alignment of the electronic eyewear device 100A with the remote electronic eyewear device 100B. The VIO pose tracker 1100 is a 6DOF pose tracker that tracks the head pose of the user of the electronic eyewear 100 in six degrees of freedom (x, y, z, pitch, yaw, roll) using IMU 972 and camera images 758A and 758B to estimate the pose of the respective IMU 972. The electronic eyewear device 100A and the remote electronic eyewear device 100B may be aligned by a variety of methods, such as by utilizing a point, marker, or map. Multiple remote electronic eyewear devices may be present in the system and method.

At block 1404, approximating the 3D position of the remote electronic eyewear device 100B worn by User B generating a sound, such as a voice 1302, with the VIO pose tracker 1100 of the electronic eyewear device 100A and the remote electronic eyewear device 100B. For example, the location of lips of the remote User B is approximated through the position of the electronic eyewear device 100B. This is done by using a simple face model, where the position of the lips with respect to the remote electronic eyewear device can be accurately estimated.

At block 1406, the processor 932 separates the audio signals (i.e., voices) generated by User B and User C. The processor 932 uses the 3D position of User B generating voice 1302 to unmix and isolate the voice 1302 from other voices and sounds produced by other sound sources in the surrounding environment 1300 of the electronic eyewear device 100A, such as a voice 1304 generated by User C.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±10% from the stated amount.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. Electronic eyewear device, comprising:
    an inertial measurement unit (IMU);
    a pose tracker;
    a microphone array configured to receive sounds from audio sources in an environment and generate audio signals;
    a head-mounting frame that supports the IMU, the pose tracker, and the microphone array; and
    a processor configured to:
        generate a trajectory of the electronic eyewear device worn by a user using the pose tracker;
        determine a trajectory of a remote electronic eyewear device worn by another user by identifying a fixed point on a symmetry plane of a face of the other user;
        align the trajectory of the pose tracker with the trajectory of the remote electronic eyewear device;
        determine a location of the remote electronic eyewear device from the determined trajectory;
        unmix the received sounds based on the determined location of the remote electronic eyewear device; and
        enable the user to select a desired direction to isolate the sounds by interacting with the electronic eyewear device.

2. The electronic eyewear device of claim 1, wherein the processor is further configured to establish a shared coordinate system between the electronic eyewear device and the remote electronic eyewear device using the trajectories.

3. The electronic eyewear device of claim 2, wherein the processor is further configured to use the trajectories and the microphone array to unmix the received sounds.

4. The electronic eyewear device of claim 3, wherein the processor is further configured to determine a direction of arrival of the received sounds relative to the electronic eyewear device.

5. The electronic eyewear device of claim 3, further comprising:
    at least one speaker supported by the head-mounting frame to present unmixed voices to a user of the electronic eyewear device.

6. The electronic eyewear device of claim 1, wherein the electronic eyewear device is configured to have an orientation calibrated to the remote electronic eyewear device.

7. The electronic eyewear device of claim 2, wherein the processor is configured to:
    use the aligned trajectories to transform poses of the electronic eyewear device into the shared coordinate system.

8. The electronic eyewear device of claim 1, wherein the electronic eyewear device further comprises a beamformer configured to separate the audio signals based on the determined location of the remote electronic device.

9. An interactive augmented reality method for use of an electronic eyewear device having an inertial measurement unit (IMU), a pose tracker, a microphone array configured to receive sounds from an environment and generate audio signals, a head-mounting frame that supports the IMU, the pose tracker, and the microphone array, and a processor, the processor:
    using the pose tracker to generate a trajectory of the electronic eyewear device;
    determining a trajectory of a remote electronic eyewear device worn by another user by identifying a fixed point on a symmetry plane of a face of the other user;
    aligning the trajectory of the pose tracker with the trajectory of the remote electronic eyewear device;
    determining a location of the remote electronic eyewear device from the received trajectory;
    unmixing the received sounds based on the determined location of the remote electronic eyewear device; and
    enabling the user to select a desired direction to isolate the sounds by interacting with the electronic eyewear device.

10. The method of claim 9, wherein the processor establishes a shared coordinate system between the electronic eyewear device and the remote electronic eyewear device using the trajectories.

11. The method of claim 10, wherein the processor uses the trajectories and the microphone array to unmix the received sounds.

12. The method of claim 11, wherein the processor determines a direction of arrival of the received sounds relative to the electronic eyewear device.

13. The method of claim 11, further comprising at least one speaker supported by the head-mounting frame and presenting unmixed voices to a user of the electronic eyewear device.

14. The method of claim 9, wherein the electronic eyewear device has an orientation calibrated to the remote electronic eyewear device.

15. The method of claim 11, wherein the processor:
uses the aligned trajectories to transform poses of the electronic eyewear device into the shared coordinate system.

16. The method of claim 9, wherein the electronic eyewear device further comprises a beamformer configured to separate the audio signals based on the determined location of the remote electronic device.

17. A non-transitory computer-readable medium storing program code which, when executed, is operative to cause an electronic processor of an electronic eyewear device having an inertial measurement unit (IMU), a pose tracker, a microphone array configured to receive sounds from an environment and generate audio signals, and a head-mounting frame that supports the IMU, pose tracker, and microphone array, to perform the steps of:
using the pose tracker to generate a trajectory of the electronic eyewear device;
determining a trajectory of a remote electronic eyewear device worn by another user by identifying a fixed point on a symmetry plane of a face of the other user;
aligning the trajectory of the pose tracker with the trajectory of the remote electronic eyewear device;
determining a location of the remote electronic eyewear device from the received trajectory;
unmixing the received sounds based on the determined location of the remote electronic eyewear device; and
enabling the user to select a desired direction to isolate the sounds by interacting with the electronic eyewear device.

18. The non-transitory computer-readable medium storing program code of claim 17, further comprising code for the processor to establish shared coordinate system between the electronic eyewear device and the remote electronic eyewear device using the trajectories.

19. The non-transitory computer-readable medium storing program code of claim 18, further comprising code for:
the processor to use the trajectories and the microphone array to unmix the received sounds.

20. The non-transitory computer-readable medium storing program code of claim 18, further comprising code for:
the processor to determine a direction of arrival of the received sounds relative to the electronic eyewear device.

* * * * *